United States Patent
Makinen et al.

(10) Patent No.: US 10,404,921 B2
(45) Date of Patent: *Sep. 3, 2019

(54) ZOOM INPUT AND CAMERA INFORMATION

(71) Applicant: Nokia Technologies Oy, Espoo (FI)

(72) Inventors: Toni Makinen, Pirkkala (FI); Mikko Tammi, Tampere (FI); Miikka Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,849

(22) Filed: Feb. 7, 2017

(65) Prior Publication Data

US 2017/0150062 A1  May 25, 2017

Related U.S. Application Data

(63) Continuation of application No. 14/700,458, filed on Apr. 30, 2015, now Pat. No. 9,602,732.

(30) Foreign Application Priority Data

May 6, 2014  (EP) .................................... 14167149

(51) Int. Cl.
*H04N 5/262* (2006.01)
*H04N 5/232* (2006.01)
(Continued)

(52) U.S. Cl.
CPC ..... *H04N 5/23296* (2013.01); *G06F 3/03548* (2013.01); *H04N 5/2258* (2013.01);
(Continued)

(58) Field of Classification Search
CPC .. G03B 5/00; H04N 5/23296; H04N 5/23216; G08B 13/1963; G08B 13/19689; G02B 7/04; A61B 1/00188
See application file for complete search history.

(56) References Cited

U.S. PATENT DOCUMENTS 7,256,944 B2 * 8/2007 Labaziewicz ........ H04N 5/2254
348/E5.028
9,602,732 B2  3/2017 Makinen et al.
(Continued)

FOREIGN PATENT DOCUMENTS

WO  WO 2014/162171 A1  10/2014

OTHER PUBLICATIONS

"Samsung Galaxy S4—Dual Camera Split Screen" [online] [retrieved Apr. 13, 2018]. Retrieved from the Internet:<URL:http://www.youtube.com/watch?v=zo_otshqmnU> dated Jun. 11, 2013.

(Continued)

*Primary Examiner* — Chia Wei A Chen

(74) *Attorney, Agent, or Firm* — Alston & Bird LLP

(57) ABSTRACT

A method comprising receiving first camera information from a first camera module that is configured to face in a first camera direction, causing display of at least part of the first camera information, receiving information indicative of a zoom input that corresponds with a zoom direction that signifies zooming out of the first camera information, determining that the zoom input is indicative of zooming beyond a zoom out threshold associated with the first camera information, receiving second camera information from a second camera module that is configured to face in a second camera direction based, at least in part, on the determination that the zoom input is indicative of zooming beyond the zoom out threshold, and causing display of at least part of the second camera information is disclosed.

20 Claims, 17 Drawing Sheets

(51) Int. Cl.
  *H04N 5/225* (2006.01)
  *G06F 3/0354* (2013.01)
  *H04N 5/247* (2006.01)
  *H04R 1/40* (2006.01)
  *H04R 3/00* (2006.01)
  *H04R 5/027* (2006.01)
  *G06F 3/0484* (2013.01)
  *G06F 3/0488* (2013.01)

(52) U.S. Cl.
  CPC ..... *H04N 5/23216* (2013.01); *H04N 5/23245* (2013.01); *H04N 5/23293* (2013.01); *H04N 5/247* (2013.01); *H04N 5/2624* (2013.01); *H04N 5/2628* (2013.01); *H04R 1/406* (2013.01); *H04R 3/005* (2013.01); *H04R 5/027* (2013.01); *G06F 3/0488* (2013.01); *G06F 3/04847* (2013.01)

(56) References Cited

U.S. PATENT DOCUMENTS

| | | | | |
|---|---|---|---|---|
| 2002/0122665 | A1* | 9/2002 | Suzuki | G03B 17/00 396/72 |
| 2008/0218611 | A1* | 9/2008 | Parulski | H04N 5/2258 348/262 |
| 2008/0218612 | A1* | 9/2008 | Border | G01S 19/45 348/262 |
| 2008/0218613 | A1* | 9/2008 | Janson | G03B 15/00 348/262 |
| 2008/0219654 | A1* | 9/2008 | Border | H04N 5/23212 396/89 |
| 2010/0149353 | A1* | 6/2010 | Jang | H04N 5/23248 348/208.12 |
| 2011/0019058 | A1 | 1/2011 | Sakai et al. | |
| 2011/0076003 | A1 | 3/2011 | Cho et al. | |
| 2011/0243538 | A1* | 10/2011 | Morimoto | H04N 5/23219 396/77 |
| 2012/0120303 | A1* | 5/2012 | Yamanaka | G02B 7/102 348/347 |
| 2012/0281129 | A1 | 11/2012 | Wang et al. | |
| 2014/0184854 | A1* | 7/2014 | Musatenko | H04N 5/23296 348/240.2 |
| 2015/0029387 | A1* | 1/2015 | Kawai | H04N 5/23212 348/347 |
| 2015/0054855 | A1* | 2/2015 | Sato | G06F 3/04845 345/661 |
| 2015/0116547 | A1* | 4/2015 | Laroia | G02B 13/009 348/240.1 |
| 2015/0146031 | A1* | 5/2015 | Kageyama | H04N 5/23245 348/220.1 |
| 2015/0215518 | A1* | 7/2015 | Nishiguchi | H04N 5/23212 348/240.3 |

OTHER PUBLICATIONS

Extended European Search Report for corresponding European Patent Application No. 14167149.5 dated Aug. 27, 2014, 7 pages.
Intention to Grant Patent for European Application No. 14 167 149.5 dated Jun. 6, 2017, 5 pages.
Decision to Grant for European Application No. 14 157 149.5 dated Nov. 23, 2017, 2 pages.
Notice of Allowance for U.S. Appl. No. 14/700,458 dated Nov. 17, 2016.
Double Camera Photo Effect App—Aplikacije za Androis v. storitvi Google Play [online] [retrieved Mar. 28, 2019]. Retrieved from the Internet: <URL: https://web.archive.org/web/20131229151727/ https://play.google.com/store/apps/details?id=com.twistfuture. dualcamera>. (dated Dec. 29, 2013), 2 pages.

* cited by examiner

ZOOM INPUT AND CAMERA INFORMATION

TECHNICAL FIELD

The present application relates generally to a zoom input and camera information.

BACKGROUND

As electronic apparatuses become increasingly prevalent in our society, many users have become increasingly dependent on their electronic apparatus in daily life. For example, users are increasingly using their apparatuses to capture video and images, to share video and images with other people, and to display video and images. As such, it may be desirable to configure an electronic apparatus such that a user of the electronic apparatus may capture video, images, and/or the like in an intuitive manner.

SUMMARY

Various aspects of examples of the invention are set out in the claims.

One or more embodiments may provide an apparatus, a computer readable medium, a non-transitory computer readable medium, a computer program product, and/or a method for receiving first camera information from a first camera module that is configured to face in a first camera direction, causing display of at least part of the first camera information, receiving information indicative of a zoom input that corresponds with a zoom direction that signifies zooming out of the first camera information, determining that the zoom input is indicative of zooming beyond a zoom out threshold associated with the first camera information, receiving second camera information from a second camera module that is configured to face in a second camera direction based, at least in part, on the determination that the zoom input is indicative of zooming beyond the zoom out threshold, and causing display of at least part of the second camera information.

One or more embodiments may provide an apparatus, a computer readable medium, a computer program product, and/or a non-transitory computer readable medium having means for receiving first camera information from a first camera module that is configured to face in a first camera direction, means for causing display of at least part of the first camera information, means for receiving information indicative of a zoom input that corresponds with a zoom direction that signifies zooming out of the first camera information, determining that the zoom input is indicative of zooming beyond a zoom out threshold associated with the first camera information, means for receiving second camera information from a second camera module that is configured to face in a second camera direction based, at least in part, on the determination that the zoom input is indicative of zooming beyond the zoom out threshold, and means for causing display of at least part of the second camera information.

An apparatus comprising at least one processor and at least one memory, the memory comprising machine-readable instructions, that when executed cause the apparatus to perform receipt of first camera information from a first camera module that is configured to face in a first camera direction, causation of display of at least part of the first camera information, receiving information indicative of a zoom input that corresponds with a zoom direction that signifies zooming out of the first camera information, determination that the zoom input is indicative of zooming beyond a zoom out threshold associated with the first camera information, receipt of second camera information from a second camera module that is configured to face in a second camera direction based, at least in part, on the determination that the zoom input is indicative of zooming beyond the zoom out threshold, and causation of display of at least part of the second camera information.

In at least one example embodiment, causation of the display of the second camera information is caused, at least in part, by the determination that the zoom input is indicative of zooming beyond the zoom out threshold.

In at least one example embodiment, the first camera information comprises at least one of video information or image information.

In at least one example embodiment, the second camera information comprises at least one of video information or image information.

One or more example embodiments further perform initiation of a viewfinder interaction mode, wherein receipt of the first camera information and receipt of the second camera information are performed in the viewfinder interaction mode.

One or more example embodiments further perform causation of storage of the first camera information.

One or more example embodiments further perform causation of storage of the second camera information.

In at least one example embodiment, the zoom input refers to an input that is indicative of a user desire to change the zoom level of camera information.

In at least one example embodiment, the zoom out threshold refers to a zoom level beyond which zooming out is precluded In at least one example embodiment, the zoom input being indicative of zooming beyond the zoom out threshold refers to the zoom input comprising movement that corresponds with the zoom direction to an extent that a zoom level indicated by the zoom input exceeds the zoom out threshold.

In at least one example embodiment, the first camera direction is substantially opposite from the second camera direction.

In at least one example embodiment, the first camera direction is substantially opposite to a direction faced by a display in which the first camera information is displayed.

In at least one example embodiment, the second camera direction substantially corresponds with a direction in which the first camera information is displayed.

In at least one example embodiment, the apparatus comprises the first camera module and the second camera module.

In at least one example embodiment, the apparatus comprises the display.

In at least one example embodiment, causation of display of the first camera information comprises display of the first camera information on the display.

In at least one example embodiment, causation of display of the second camera information comprises display of the second camera information on the display.

One or more example embodiments further perform prior to the determination that the zoom input is indicative of zooming beyond the zoom out threshold, determination that the zoom input is indicative of zooming within the zoom out threshold, and causation of zooming out of the first camera information based, at least in part, on the zoom input.

One or more example embodiments further perform subsequent to the determination that the zoom input is indicative of zooming beyond the zoom out threshold, determination that the zoom input comprises movement in the zoom direction, and causation of zooming in of the second camera information based, at least in part, on the movement in the zoom direction.

In at least one example embodiment, the zoom input comprises a pinch input, and the zoom direction is an inward direction of the pinch input.

One or more example embodiments further perform causation of display of a zoom slider interface element, wherein the zoom input comprises movement of a selection point comprised by the slider interface element in a direction that corresponds with the zoom direction.

One or more example embodiments further perform termination of display of the first camera information based, at least in part, on the determination that the zoom input is indicative of zooming beyond the zoom out threshold.

One or more example embodiments further perform enablement of the first camera module prior to receipt of the first camera information; and Disablement of the first camera module based, at least in part, on the determination that the zoom input is indicative of zooming beyond the zoom out threshold.

One or more example embodiments further perform enablement of the second camera module based, at least in part, on the determination that the zoom input is indicative of zooming beyond the zoom out threshold.

One or more example embodiments further perform receipt of audio information from at least one microphone, causation of storage of the first camera information in conjunction with the audio information, and causation of storage of the second camera information in conjunction with the audio information.

In at least one example embodiment, the audio information is received from a plurality of microphones such that the audio information comprises at least a first audio channel and a second audio channel, wherein causation of storage of the second camera information in conjunction with the audio information comprises determination of reversed polarity audio information such that a first channel of the reversed polarity audio information corresponds with the second channel of the audio information and a second channel of the reversed polarity audio information corresponds with the first channel of the audio information, and storage of the second camera information in conjunction with the reversed polarity audio information.

In at least one example embodiment, the apparatus comprises the at least one microphone.

One or more example embodiments further perform receipt of information indicative of a different zoom input that corresponds with a different zoom direction that is substantially opposite from the zoom direction, determination that the different zoom input is indicative of zooming beyond a different zoom out threshold that is associated with the second camera information, receipt of the first camera information from the first camera module based, at least in part, on the determination that the different zoom input is indicative of zooming beyond the different zoom out threshold, and causation of display of at least part of the first camera information.

One or more example embodiments further perform, prior to the determination that the different zoom input is indicative of zooming beyond the different zoom out threshold, determination that the different zoom input is indicative of zooming within the different zoom out threshold, and causation of zooming out of the second camera information based, at least in part, on the different zoom input.

One or more example embodiments further perform, subsequent to the determination that the different zoom input is indicative of zooming beyond the different zoom out threshold, determination that the different zoom input comprises movement in the different zoom direction, and causation of zooming in of the first camera information based, at least in part, on the movement in the different zoom direction.

In at least one example embodiment, causation of display of the first camera information is performed in a first camera information single view mode, and causation of display of the second camera information is performed in a second camera information single view mode.

In at least one example embodiment, the first camera information single view mode refers to display of at least part of the first camera information absent display of any part of the second camera information.

In at least one example embodiment, the second camera information single view mode refers to display of at least part of the second camera information absent display of any part of the first camera information.

One or more example embodiments further perform determination that the zoom input is indicative of zooming within a different zoom out threshold that is associated with the second camera information, wherein the receipt of the second camera information from the second camera module is based, at least in part, on the determination that the zoom input is indicative of zooming within the different zoom out threshold.

One or more example embodiments further perform causation of display of at least part of the first camera information and at least part of the second camera information in a dual view mode based, at least in part, on the determination that the zoom input is indicative of zooming beyond the zoom out threshold.

One or more example embodiments further perform determination that the zoom input is indicative of zooming within a dual view mode zoom out threshold associated with the second camera information, wherein causation of display of the second camera information in the dual view mode comprises zooming out of the second camera information based, at least in part, on the zoom input.

One or more example embodiments further perform determination that the zoom input is indicative of zooming beyond the dual view mode zoom out threshold, causation of zooming out of the second camera information in accordance with the dual view mode zoom out threshold, and causation of zooming in of the first camera information, based at least in part, on the zoom input.

One or more example embodiments further perform, prior to the determination that the zoom input is indicative of zooming beyond the dual view mode zoom out threshold, determination of a second camera information size that is inversely proportional to a zoom level of the second camera information, wherein the causation of display of the second camera information in the dual view mode is performed such that the second camera information conforms to the second camera information size, and determination of a first camera information size that is directly proportional to the zoom level of the second camera information, wherein the causation of display of the first camera information in the dual view mode is performed such that the first camera information conforms to the first camera information size.

One or more example embodiments further perform, subsequent to the determination that the zoom input is indicative of zooming beyond the dual view mode zoom out threshold, determination of a first camera information size that is inversely proportional to a zoom level of the first camera information, wherein the causation of display of the first camera information in the dual view mode is performed such that the first camera information conforms to the first camera information size, and determination of a second camera information size that is directly proportional to the zoom level of the first camera information, wherein the causation of display of the second camera information in the dual view mode is performed such that the second camera information conforms to the second camera information size.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
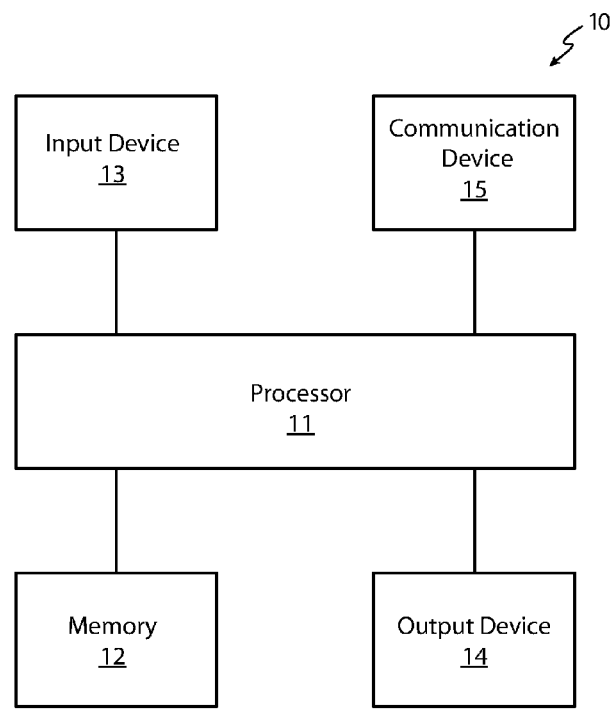
FIG. 1 is a block diagram showing an apparatus according to at least one example embodiment.

An embodiment of the invention and its potential advantages are understood by referring to FIGS. 1 through 12 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
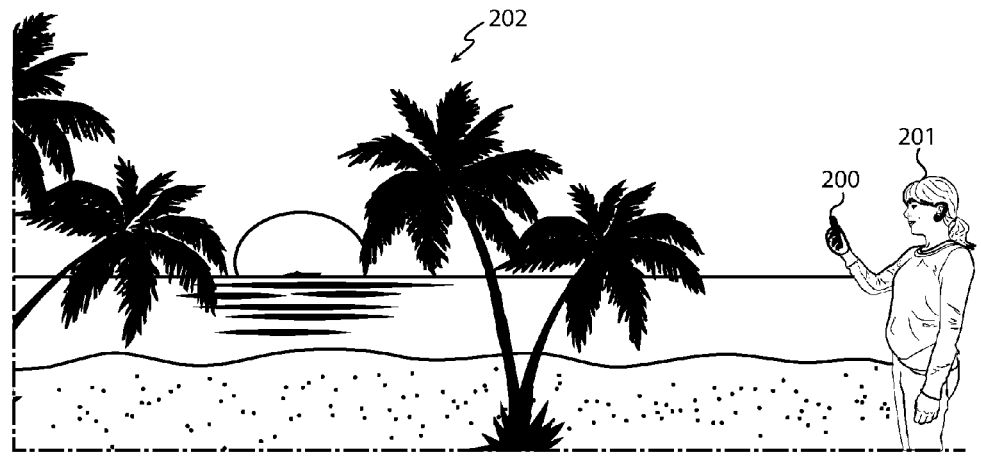
FIG. 2 is a diagram illustrating receipt of camera information according to at least one example embodiment.

FIG. 2 is a diagram illustrating receipt of camera information according to at least one example embodiment. The example of FIG. 2 is merely an example and does not limit the scope of the claims. For example, the apparatus may vary, the number of camera modules may vary, the camera information may vary, and/or the like.

Oftentimes, it may be desirable for an apparatus to comprise a plurality of camera modules. For example, a user of an apparatus comprising a plurality of camera modules may be able to receive camera information from different perspectives corresponding with the configuration of each camera module without changing the orientation of the apparatus. For instance, a first camera module comprised by the apparatus may be configured to face in a forward direction, and a second camera module comprised by the apparatus may be configured to face in a rear direction. The camera information may comprise video information, image information, and/or the like. In this manner, the user may receive camera information from the first camera module when the user desires camera information associated with the forward direction and may receive camera information from the second camera module when the user desires camera information associated with the rear direction.

In many circumstances, it may be desirable for an apparatus comprising a plurality of camera modules to comprise a display. For example, when receiving camera information from a camera module, it may be desirable to display the camera information received from the camera module on a display. For example, in circumstances where video information received from a camera module is displayed on a display comprised by the apparatus, a user of the apparatus may use the display as a viewfinder. In some circumstances, it may be desirable to initiate a viewfinder interaction mode. A viewfinder interaction mode may refer to a mode of the apparatus from which the user may view camera information, configure camera information, invoke capture of camera information, and/or the like. For example, the user may be able to control the zoom level of camera information in a viewfinder interaction mode, a camera recording mode, a camera preview mode, and/or the like. In at least one example embodiment, the apparatus initiates a viewfinder interaction mode. In such an example embodiment, the first camera information and/or the second camera information may be received in the viewfinder interaction mode, while the apparatus is in the viewfinder interaction mode, subsequent to initiation of the viewfinder interaction mode, and/or the like.

FIG. 2 illustrates apparatus 200. Apparatus 200 comprises a first camera module configured to face in a first camera direction, a second camera module configured to face in a second camera direction, and a display configured to display camera information received from the first camera module and the second camera module. A camera direction may refer to a direction from which a camera module receives camera information. In the example of FIG. 2, the first camera direction of apparatus 200 is substantially opposite from the second camera direction of apparatus 200. In at least one example embodiment, substantially opposite refers to any deviation from exactly opposite which may not be noticeable by a user of apparatus 200, which is a result of deviation caused by manufacturing tolerances, and/or the like. The first camera direction of apparatus 200 is substantially opposite to a direction faced by the display configured to display camera information received from the first camera module and the second camera module. The second camera direction of apparatus 200 substantially corresponds with the direction faced by the display configured to display camera information received from the first camera module and the second camera module. In at least one example embodiment, substantially corresponds with refers to any deviation from exactly corresponding which may not be noticeable by a user of apparatus 200, which is a result of deviation caused by manufacturing tolerances, and/or the like.

FIG. 2 illustrates user 201 and landscape 202. User 201 is holding apparatus 200 in an orientation such that user 201 may view the display comprised by apparatus 200. In such an orientation, the first camera module comprised by apparatus 200 may receive first camera information comprising landscape 202, and the second camera module comprised by apparatus 200 may receive second camera information comprising user 201. In at least one example embodiment, the apparatus causes enablement of the first camera module prior to receipt of the first camera information. In at least one example embodiment, the apparatus causes enablement of the second camera module prior to receipt of the second camera information. In at least one example embodiment, enablement of a camera module refers to configuring a camera module such that the apparatus may receive camera information from the camera module. For example, enablement of a camera module may include providing power to camera module, establishing communication with the camera module, sending setting information to the camera module, and/or the like.

FIGS. 3A-3D are diagrams illustrating display of camera information according to at least one example embodiment. The examples of FIGS. 3A-3D are merely examples and do not limit the scope of the claims. For example, apparatus and/or display configuration may vary, zoom input may vary, zoom direction may vary, and/or the like.

Oftentimes, a user may desire to store camera information received from a camera module. For example, the user may desire to view the camera information at a later time, share the camera information with a person other than the user, and/or the like. In at least one example embodiment, the apparatus causes storage of camera information. In some circumstances, a user may desire to store camera information from more than one camera module simultaneously, alternate between camera modules from which the apparatus causes camera information to be stored, and/or the like. In circumstances such as these, it may be desirable for the user to control how the camera information from each camera module is displayed. For example, the user may desire to control a zoom level of each camera module from which the apparatus is receiving camera information, alternate which camera module the apparatus is receiving camera information from, and/or the like. In many circumstances, it may be desirable to control the display of such camera information by way of a zoom input. For example, a user may find it intuitive to alternate between the camera modules from which the apparatus is receiving camera information by way of a zoom input. A zoom input refers to an input that is indicative of a user desire to change the zoom level of camera information. In at least one example embodiment, the zoom input comprises movement in a zoom direction. A zoom direction may refer to a direction that corresponds with a user desire to increase or decrease the zoom level based, at least in part, on the direction. In at least one example embodiment, the zoom input comprises a pinch input, and the zoom direction is an inward direction of the pinch input. In at least one example embodiment, the zoom input comprises a pinch input, and the zoom direction is an outward direction of the pinch in input. A pinch input may refer to a pinch-in input, a pinch-out input, and/or the like.

In some circumstances, it may be desirable to provide the user a visual indication of the zoom level. For example, the user may desire to determine whether particular camera information is zoomed in or zoomed out by way of a visual indication of the zoom level. An example of a visual indication of the zoom level may be provided by a zoom slider interface. A zoom slider interface may refer to a visual representation analogous to a mechanical slider. A zoom slider interface may comprise a slider interface element that is indicative of the zoom level of camera information. For instance, the user may manipulate the zoom slider interface element to control the zoom level of a camera. For example, in circumstances where the user has the apparatus positioned with the top of the display angled away from the user, similar as illustrated in FIG. 2, the user may move the zoom slider interface element in a direction away from the user to cause zooming in of camera information received from a camera module configured with a camera direction away from the user. In another example, in circumstances where the user has the apparatus positioned with the top of the display angled away from the user, similar as illustrated in FIG. 2, the user may move the zoom slider interface element in a direction toward the user to cause zooming out of camera information received from a camera module configured with a camera direction away from the user. In this manner, the direction the user moves the zoom slider interface element corresponds with a zoom direction. In at least one example embodiment, the apparatus causes display of a zoom slider interface element. An example of a zoom slider interface is depicted in FIGS. 3A-3D. In at least one example embodiment, a zoom slider interface represents a selection point based, at least in part, on the displayed location of the zoom slider interface element. For example, a user may select a desired zoom level by repositioning the zoom slider interface on the display. In at least one example embodiment, the zoom input comprises movement of a selection point in a direction that corresponds with the zoom direction.

FIGS. 3A-3D illustrate apparatus 300. In the example of FIGS. 3A-3D, apparatus 300 comprises a first camera module that is configured to face in a first camera direction, a second camera module that is configured to face in a second camera direction, and display 302 that is configured to display camera information received from the first camera module and/or the second camera module. The first camera direction of apparatus 300 is substantially opposite from the second camera direction of apparatus 300. The first camera direction of apparatus 300 is substantially opposite to the direction faced by display 302. The second camera direction of apparatus 300 substantially corresponds with the direction faced by display 302. It can be seen that display 302 is displaying slider interface 304. Slider interface 304 comprises slider interface element 306 and zoom indicators 310, 314, and 318. The position of slider interface element 306 in relation to zoom indicators 310, 314, and 318 may be indicative of various zoom levels associated with the first camera module, the second camera module, and/or the like.

In at least some circumstances, a zoom input may have a zoom out threshold associated with particular camera information. A zoom out threshold may refer to a zoom level beyond which zooming out is precluded. In circumstances where an apparatus comprises multiple camera modules, camera information received from different camera modules may be associated with different zoom out thresholds. In circumstances such as these, different zoom out thresholds may be represented with the same zoom indicator. For example, in FIG. 3A, zoom indicator 314 may correspond with a zoom out threshold corresponding with the camera information received from the first camera module, and a different zoom out threshold corresponding with the camera information received from the second camera module. In some circumstances, a zoom input may be indicative of zooming within the zoom out threshold. For instance, any zoom input that results in a position of slider interface element 306 between zoom indicators 310 and 314 may be indicative of zooming within the zoom out threshold associated with the camera information received from the first camera module. Any zoom input that results in a position of slider interface element 306 between zoom indicator 314 and 318 may fail to zoom out of the camera information received from the first camera module beyond a zoom level corresponding with zoom indicator 314. In such an example, the zoom input may be indicative of zooming beyond the zoom out threshold.

In another example, any zoom input that results in a position of slider interface element 306 between zoom indicators 314 and 318 may be indicative of zooming within the different zoom out threshold associated with the camera information received from the second camera module. Any zoom input that results in a position of slider interface element 306 between zoom indicator 310 and 314 may not result in zooming out of the camera information received from the second camera module beyond a zoom level corresponding with zoom indicator 314. In such an example, the zoom input may be indicative of zooming beyond the different zoom out threshold.

As previously described, the apparatus may comprise multiple camera modules. In at least one example embodiment, the apparatus determines that the zoom input is indicative of zooming within a zoom out threshold associated with first camera information, and causes zooming out of the first camera information based, at least in part, on the zoom input. In at least one example embodiment, the apparatus determines that the zoom input is indicative of zooming within the zoom out threshold prior to the determination that the zoom input is indicative of zooming beyond the zoom out threshold. In circumstances where a zoom input is indicative of zooming beyond the zoom out threshold, the zoom input may be indicative of a user desire to zoom within a different zoom out threshold associated with second camera information. In circumstances such as these, the zoom input may enable receipt of camera information from a second camera. In at least one example embodiment, the apparatus determines that the zoom input is indicative of zooming within a different zoom out threshold that is associated with second camera information. In this manner, the receipt of the second camera information may be based, at least in part, on the determination that the zoom input is indicative of zooming within the different zoom out threshold.

Figure 3A:
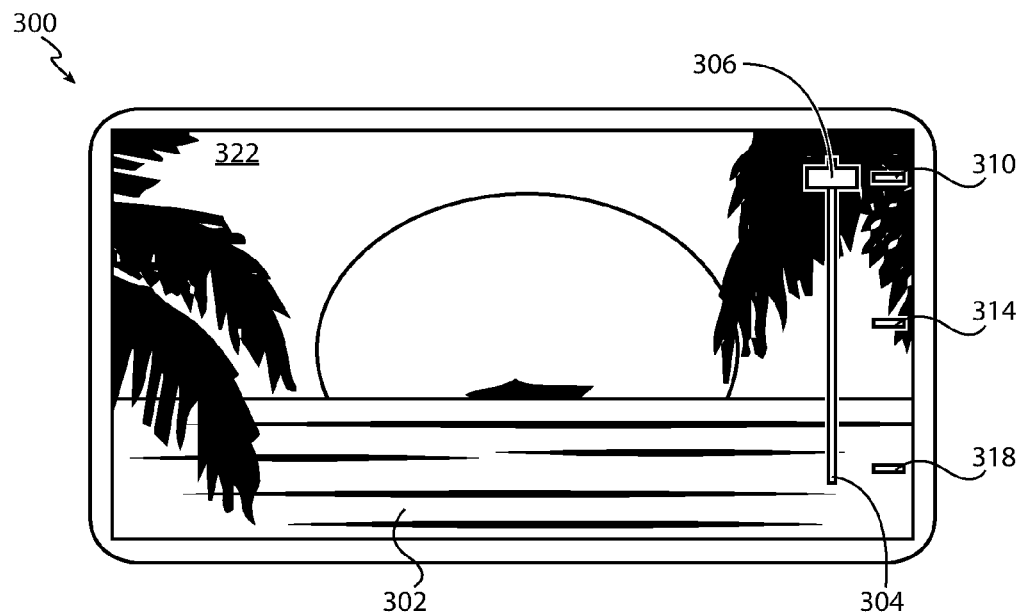
FIGS. 3A-3D are diagrams illustrating display of camera information according to at least one example embodiment.

As previously described, it may be desirable for an apparatus to display camera information received from one or more camera modules. In at least one example embodiment, the apparatus causes display of at least part of camera information received from a camera module. In at least one example embodiment, causation of display of the camera information comprises display of the camera information on the display. Displaying at least part of camera information refers to displaying at least a portion of the camera information. For example, the apparatus may display a zoomed in view of the camera information such that only a portion of the camera information is displayed, may display a cropped version of the camera information such that only a portion of the camera information is displayed, and/or the like. FIG. 3A illustrates camera information 322 displayed on display 302. In the example of FIG. 3A, camera information 322 is representative of camera information received from the first camera module comprised by apparatus 300. It can be seen that slider interface element 306 is positioned near zoom indicator 310. Such positioning of slider interface element 306 may be indicative of a zoomed in view of the camera information received from the first camera module comprised by apparatus 300.

Figure 3B:
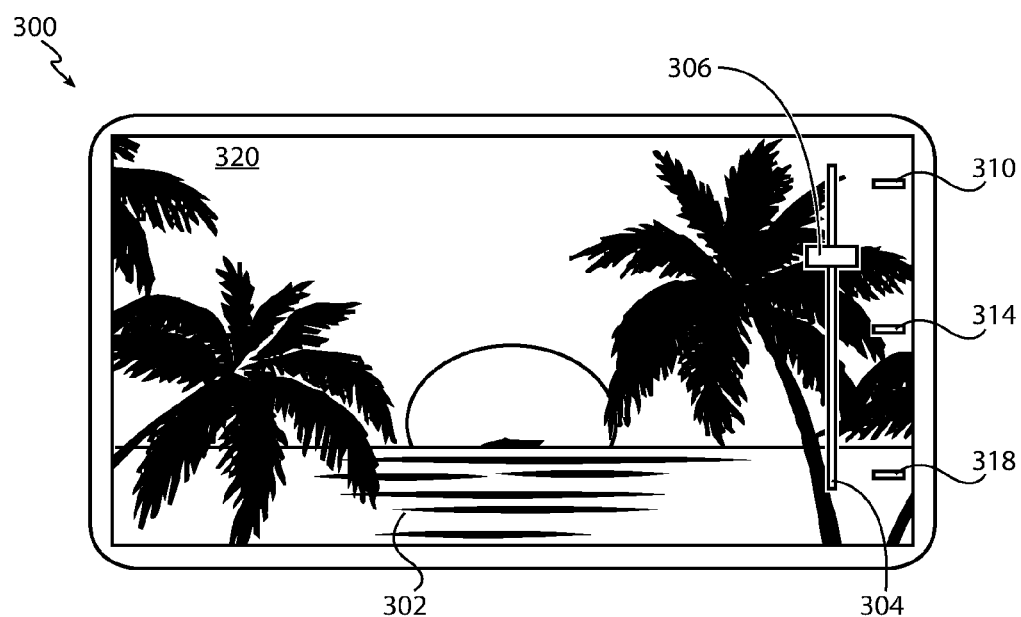

FIG. 3B illustrates camera information 320 displayed on display 302. In the example of FIG. 3B, camera information 320 is representative of camera information received from the first camera module comprised by apparatus 300. It can be seen that slider interface element 306 is positioned between zoom indicators 310 and 314. Such positioning of slider interface element 306 may be indicative of a zoomed out view of the camera information received from the first camera module comprised by apparatus 300 with respect to the zoom level indicated by zoom level 310. Although the examples of FIGS. 3A-3B depict particular zoom levels indicated by zoom indicators 310 and 314, in some circumstances zoom levels 310 and 314 may indicate different zoom levels, the relationship between the zoom levels indicated may be reversed, non-linear, and/or the like.

Figure 3C:
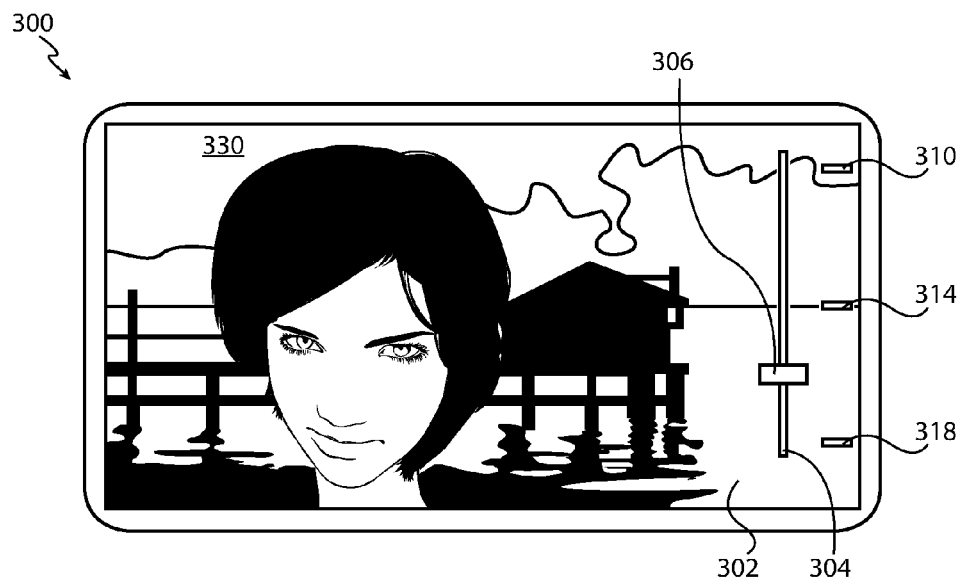

In at least one example embodiment, the apparatus causes display of at least part of second camera information received from a second camera module. In at least one example embodiment, causation of display of the second camera information comprises display of the second camera information on the display. Displaying at least part of first camera information refers to displaying at least a portion of the second camera information. For example, the apparatus may display a zoomed in view of the second camera information such that only a portion of the second camera information is displayed, may display a cropped version of the camera information such that only a portion of the camera information is displayed, and/or the like. FIG. 3C illustrates camera information 330 displayed on display 302. In the example of FIG. 3C, camera information 330 is representative of camera information received from the second camera module comprised by apparatus 300. It can be seen that slider interface element 306 is positioned between zoom indicators 314 and 318. Such positioning of slider interface element 306 may be indicative of a zoomed out view of the camera information received from the second camera module comprised by apparatus 300 with respect to the zoom level indicated by zoom level 318.

Figure 3D:
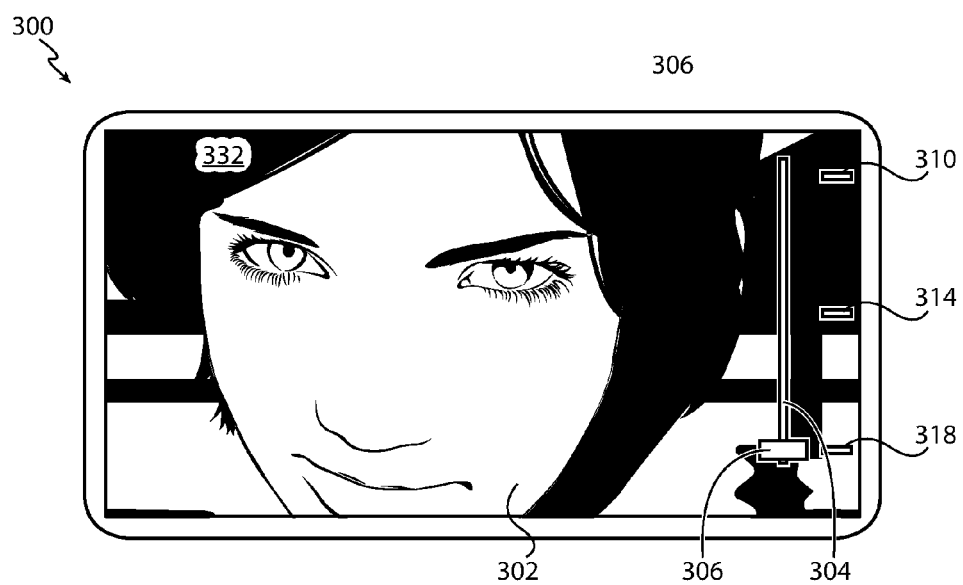

FIG. 3D illustrates camera information 332 displayed on display 302. In the example of FIG. 3D, camera information 332 is representative of camera information received from the second camera module comprised by apparatus 300. It can be seen that slider interface element 306 is positioned near zoom indicator 318. Such positioning of slider interface element 306 may be indicative of a zoomed in view of the camera information received from the second camera module comprised by apparatus 300. Although the examples of FIGS. 3C-3D depict particular zoom levels indicated by zoom indicators 314 and 318, in some circumstances zoom levels 314 and 318 may indicate different zoom levels, the relationship between the zoom levels indicated may be reversed, non-linear, and/or the like.

As previously described, it may be desirable for a user to enter a zoom input. In at least one example embodiment, the apparatus receives information indicative of a zoom input that corresponds with a zoom direction that signifies zooming out of the first camera information. For example, apparatus 300 may be displaying camera information that is similar to information 322 of FIG. 3A. Apparatus 300 may receive information indicative of a zoom input such that slider interface element 306 changes position from the position illustrated in FIG. 3A to the position illustrated in FIG. 3B. Such a zoom input may be in a zoom direction that corresponds with zooming out of the first camera information such that apparatus 300 may cause display of camera information similar to camera information 320 on display 302.

In at least one example embodiment, the apparatus receives information indicative of a zoom input that corresponds with a zoom direction that signifies zooming in of the first camera information. For example, apparatus 300 may be displaying camera information that is similar to information 320 of FIG. 3A. Apparatus 300 may receive information indicative of a zoom input. Such a zoom input may be in a zoom direction that corresponds with zooming in of the first camera information such that apparatus 300 may cause display of camera information similar to camera information 322 on display 302.

As previously described, it may be desirable to control display of camera information by receiving a zoom input. In circumstances where a zoom input is beyond a zoom out threshold associated with first camera information from a first camera module, it may be desirable to display second camera information from a second camera module. For example, such a zoom input may allow a user to display second camera information from the second camera module without any intermediate steps. In this manner, the transition to display of the second camera information may be accomplished rapidly, with little effort from the user, and/or the like. In at least one example embodiment, the apparatus determines that the zoom input is indicative of zooming beyond a zoom out threshold associated with the first camera information. In this manner, receipt of second camera information from a second camera module may be based, at least in part, on the determination that the zoom input is indicative of zooming beyond the zoom out threshold. In at least one example embodiment, causation of the display of the second camera information is caused, at least in part, by the determination that the zoom input is indicative of zooming beyond the zoom out threshold. In at least one example embodiment, enablement of the second camera module is based, at least in part, on the determination that the zoom input is indicative of zooming beyond the zoom out threshold. A zoom input being indicative of zooming beyond the zoom out threshold may refer to the zoom input comprising movement that corresponds with the zoom direction to an extent that a zoom level indicated by the zoom input exceeds the zoom out threshold For example, apparatus 300 may be displaying first camera information similar to camera information 322 as illustrated in FIG. 3A. Apparatus 300 may receive information indicative of a zoom input such that slider interface element 306 changes position from the position illustrated in FIG. 3A to the position illustrated in FIG. 3C. Such a zoom input may be in a direction corresponding with zooming out of camera information 322 such that apparatus 300 may be beyond a zoom out threshold associated with the first camera information. This may cause apparatus 300 to receive second camera information from the second camera module and display camera information similar to camera information 330 on display 302.

In some circumstances, a zoom input may comprise continued movement in the zoom direction. In such circumstances, it may be desirable to control the zoom level of camera information based, at least in part, on this continued movement. For example, it may be desirable to display an animation depicting a continuous zooming in or out of the camera information based, at least in part, on movement in a zoom direction. In at least one example embodiment, subsequent to the determination that the zoom input is indicative of zooming beyond the zoom out threshold, the apparatus determines that the zoom input comprises movement in the zoom direction, and causes zooming in of the second camera information based, at least in part, on the movement in the zoom direction. For example, apparatus 300 may be displaying camera information similar to camera information 322 as illustrated in FIG. 3A. Apparatus 300 may receive information indicative of a zoom input such that slider interface element 306 changes position from the position illustrated in FIG. 3A to the position illustrated in FIG. 3D. Such a zoom input may be in a direction corresponding with zooming out of the first camera information such that apparatus 300 may be beyond a zoom out threshold associated with the first camera information. This may cause apparatus 300 to receive second camera information from the second camera module and display camera information similar to camera information 330 on display 302 and, subsequently, cause zooming of the second camera information such that the apparatus causes camera information similar to camera information 332 to be displayed on display 302.

In at least some circumstances, it may be desirable to terminate display of the first camera information. For example, if the user wishes to display the second camera information, the display may be less cluttered if the display of the first camera information is terminated. In at least one example embodiment, the apparatus terminates display of the first camera information. In at least one example embodiment, termination of display of the first camera information based, at least in part, on the determination that the zoom input is indicative of zooming beyond the zoom out threshold. Display of camera information in such a manner may be referred to as display in a camera information single view mode. In at least one example embodiment, causation of display of the first camera information is performed in a first camera information single view mode, and causation of display of the second camera information is performed in a second camera information single view mode. The first camera information single view mode refers to display of at least part of the first camera information absent display of any part of the second camera information. The second camera information single view mode refers to display of at least part of the second camera information absent display of any part of the first camera information.

In at least some circumstances, it may be desirable to perform the interactions described in FIGS. 3A-3D in a reverse direction. Such reverse direction interactions are described with regards to FIG. 9 and FIG. 10.

FIGS. 4A-4G are diagrams illustrating display of camera information according to at least one example embodiment. The examples of FIGS. 4A-4G are merely examples and do not limit the scope of the claims. For example, the single view modes may vary, the dual view mode may vary, the zoom input may vary, and/or the like.

In at least some circumstances, it may be desirable to display camera information received from multiple camera modules simultaneously. For example, a user may wish to capture information from multiple camera modules simultaneously. In circumstances such as these, displaying camera information received from multiple camera modules simultaneously may allow the user to view the camera information from multiple camera modules while the camera information is captured. This may help the user frame the camera information in a manner desired by the user. In some circumstances, it may be desirable to allow a user to alternate between a single view mode and a dual view mode. A dual view mode may refer to display of at least part of a first camera information simultaneously with at least part of a second camera information on the same display.

FIGS. 4A-4G illustrate apparatus 400. Apparatus 400 comprises a first camera module configured to face in a first camera direction, a second camera module configured to face in a second camera direction, and display 402 configured to display camera information received from the first camera module and the second camera module. The first camera direction of apparatus 400 is substantially opposite from the second camera direction of apparatus 400. The first camera direction of apparatus 400 is substantially opposite to the direction faced by display 402. The second camera direction of apparatus 400 substantially corresponds with the direction faced by display 402. It can be seen that display 402 is displaying slider interface 404. Slider interface 404 comprises slider interface element 406 and zoom indicators 410, 412, 414, 416, and 418. The position of slider interface element 406 with respect to zoom indicators 410, 412, 414, 416, and 418 may be indicative of various zoom levels associated with the first camera module and the second camera module.

As previously described, in some circumstances, a zoom input may have a zoom out threshold associated with a particular camera module. In the examples of FIGS. 4A-4G, zoom indicator 412 corresponds with a zoom out threshold corresponding with the first camera module, and zoom indicator 416 corresponds with a different zoom out threshold corresponding with the second camera module.

As previously described, in some circumstances, a zoom input may be indicative of zooming within the zoom out threshold. For instance, any zoom input that results in a position of slider interface element 406 between zoom indicators 410 and 412 may be indicative of zooming within the zoom out threshold associated with the first camera module. Any zoom input that results in a position of slider interface element 406 between zoom indicator 412 and 418 may not result in zooming out of the camera information received from the first camera module beyond a zoom level corresponding with zoom indicator 416. In such an example, the zoom input may be indicative of zooming beyond the zoom out threshold.

In another example, any zoom input that results in a position of slider interface element 406 between zoom indicators 416 and 418 may be indicative of zooming within the different zoom out threshold associated with the second camera module. Any zoom input that results in a position of slider interface element 406 between zoom indicator 410 and 416 may not result in zooming out of the camera information received from the second camera module beyond a zoom level corresponding with zoom indicator 416. In such an example, the zoom input may be indicative of zooming beyond the different zoom out threshold.

In at least some circumstances, a zoom input may have a dual view zoom out threshold. A dual view zoom out threshold may refer to a zoom level beyond which zooming out is precluded while operating in a dual view mode. In the examples of FIGS. 4A-4G, zoom indicator 414 corresponds with a dual view zoom out threshold corresponding with the first camera module, and a different dual view mode zoom out threshold corresponding with the second camera module.

In some circumstances, a zoom input may be indicative of zooming within the dual view zoom out threshold. For example, a zoom input that results in a position of slider interface element 406 between zoom indicators 414 and 416 may be indicative of zooming within the zoom out threshold associated with the first camera module. In such an example, a zoom input that results in a position of slider interface element 406 between zoom indicator 412 and 414 may not result in zooming out of the camera information received from the first camera module beyond a zoom level corresponding with zoom indicator 414. In such an example, the zoom input may be indicative of zooming beyond the zoom out threshold.

In another example, a zoom input that results in a position of slider interface element 406 between zoom indicators 412 and 414 may be indicative of zooming within the different dual view zoom out threshold associated with the second camera module. In such an example, a zoom input that results in a position of slider interface element 406 between zoom indicator 414 and 416 may not result in zooming out of the camera information received from the second camera module beyond a zoom level corresponding with zoom indicator 414. In such an example, the zoom input may be indicative of zooming beyond the different dual view zoom out threshold.

Figure 4A:
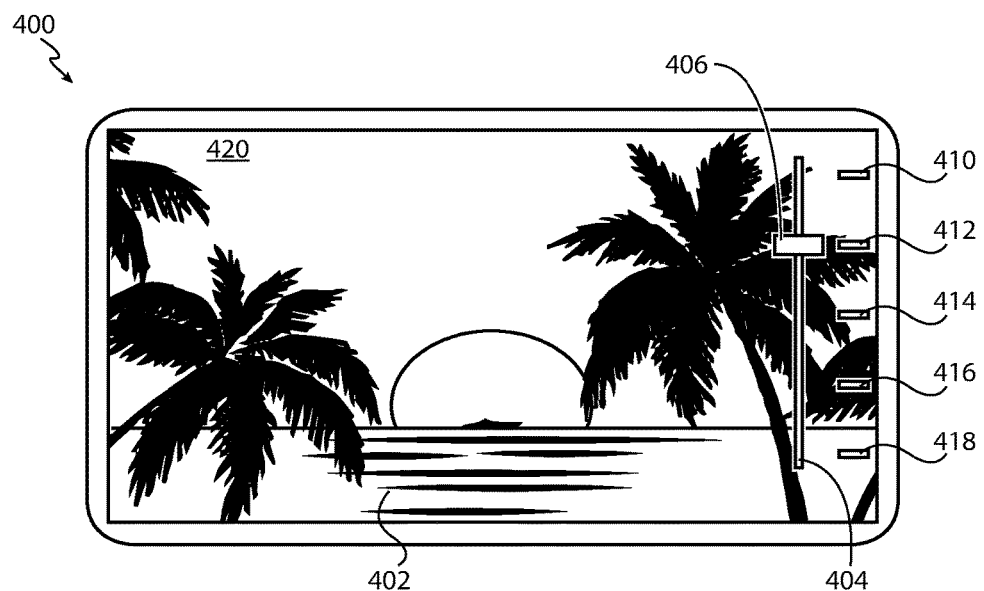
FIGS. 4A-4G are diagrams illustrating display of camera information according to at least one example embodiment.

FIG. 4A illustrates camera information 420 displayed on display 402 in a single view mode. In the example of FIG. 4A, camera information 420 is representative of camera information received from a first camera module that is comprised by apparatus 400. It can be seen that slider interface element 406 is positioned near zoom indicator 412. Such positioning of slider interface element 406 may be indicative of a zoomed out view of the camera information received from the first camera module comprised by apparatus 400.

Figure 4B:
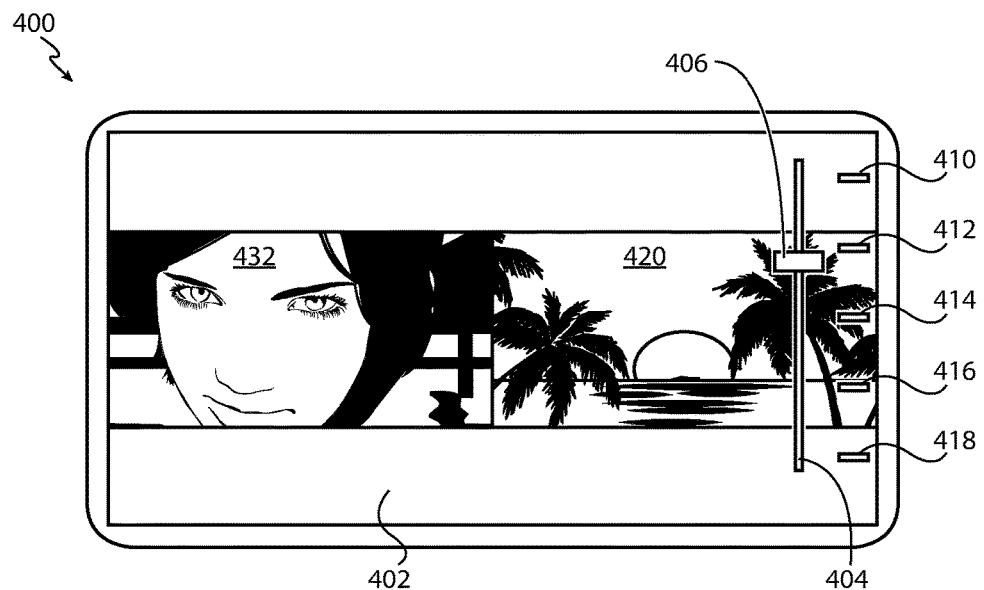

FIG. 4B illustrates camera information 420 and 432 displayed on display 402 in a dual view mode. In the example of FIG. 4B, camera information 432 is representative of camera information received from a second camera module that is comprised by apparatus 400. It can be seen that slider interface element 406 is positioned between zoom indicators 412 and 414 nearer to zoom indicator 412. Such positioning of slider interface element 406 may be indicative of a zoomed out view of the camera information received from the first camera module comprised by apparatus 400, and a zoomed in view of the camera information received from the second camera module comprised by apparatus 400.

As previously described, it may be desirable to allow a user to alternate between a single view mode and a dual view mode. In some circumstances it may be desirable to control alternation between a single view mode and a dual view mode by way of a zoom input. For example, controlling alternation between a single view mode and a dual view mode by way of the zoom input may require little interaction with the user, may be intuitive based on user familiarity with zoom functionality, and/or the like. In at least one example embodiment, the apparatus causes display of at least part of the first camera information and at least part of the second camera information in a dual view mode. In at least one example embodiment, the apparatus causes display of at least part of the first camera information and at least part of the second camera information in a dual view mode based, at least in part, on the determination that the zoom input is indicative of zooming beyond the zoom out threshold.

For example, apparatus 400 may be displaying camera information similar to camera information 420 as illustrated in FIG. 4A. Apparatus 400 may receive information indicative of a zoom input such that slider interface element 406 changes position from the position illustrated in FIG. 4A to the position illustrated in FIG. 4B. Such a zoom input may be indicative of zooming beyond the zoom out threshold of the first camera information. This may cause apparatus 400 to display at least part of the first camera information and at least part of the second camera information in a dual view mode camera information similar to camera information 420 and 432 on display 402.

Figure 4C:
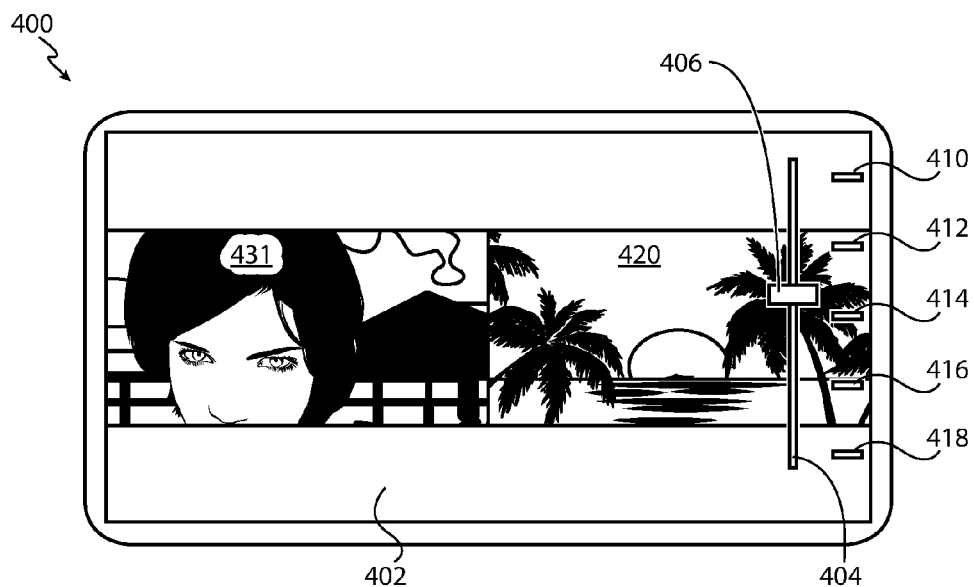

FIG. 4C illustrates camera information 420 and 431 displayed on display 402 in a dual view mode. In the example of FIG. 4C, camera information 431 is representative of camera information received from the second camera module comprised by apparatus 400. It can be seen that slider interface element 406 is positioned between zoom indicators 412 and 414 nearer to zoom indicator 414. Such positioning of slider interface element 406 may be indicative of a zoomed out view of the camera information received from the first camera module comprised by apparatus 400, and a less zoomed in view of the camera information received from the second camera module comprised by apparatus 400 with respect to camera information 432.

Figure 4D:
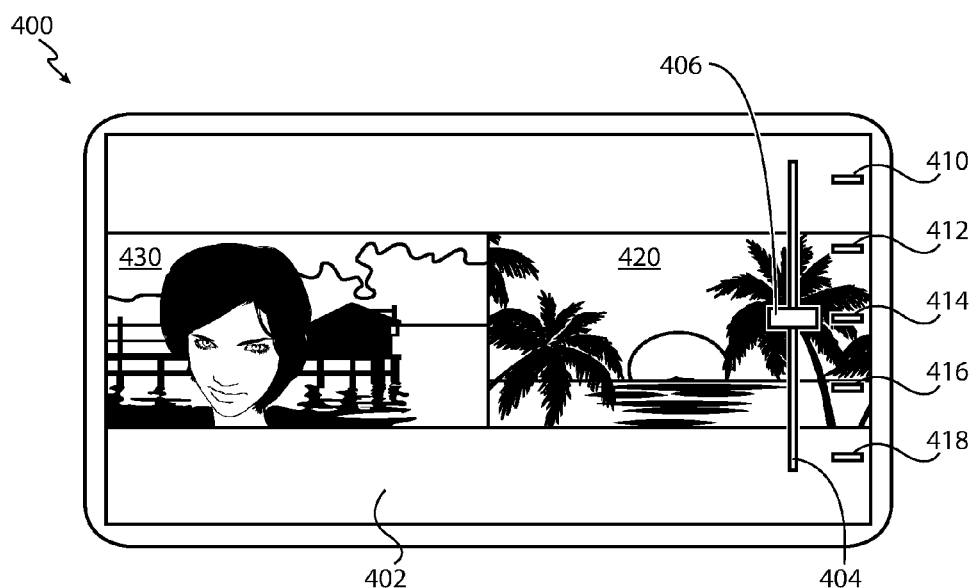

FIG. 4D illustrates camera information 420 and 430 displayed on display 402 in a dual view mode. In the example of FIG. 4D, camera information 430 is representative of camera information received from the second camera module comprised by apparatus 400. It can be seen that slider interface element 406 is positioned approximately at level indicator 414. Such positioning of slider interface element 406 may be indicative of a zoomed out view of the camera information received from the first camera module comprised by apparatus 400, and a zoomed out view of the camera information received from the second camera module comprised by apparatus 400.

As previously described, a zoom input may be indicative of zooming within the dual view zoom out threshold. In at least one example embodiment, the apparatus determines that the zoom input is indicative of zooming within a dual view mode zoom out threshold associated with the second camera information. In this manner, causation of display of the second camera information in the dual view mode may comprise zooming out of the second camera information based, at least in part, on the zoom input. For example, apparatus 400 may be displaying camera information similar to camera information 432 as illustrated in FIG. 4B. Apparatus 400 may receive information indicative of a zoom input such that slider interface element 406 changes position from the position illustrated in FIG. 4B to the position illustrated in FIG. 4C. Such a zoom input may cause display of camera information similar to camera information 431 on display 402. In another example, apparatus 400 may be displaying camera information similar to camera information 431 as illustrated in FIG. 4C. Apparatus 400 may receive information indicative of a zoom input such that slider interface element 406 changes position from the position illustrated in FIG. 4C to the position illustrated in FIG. 4D. Such a zoom input may cause display of camera information similar to camera information 430 on display 402.

Figure 4E:
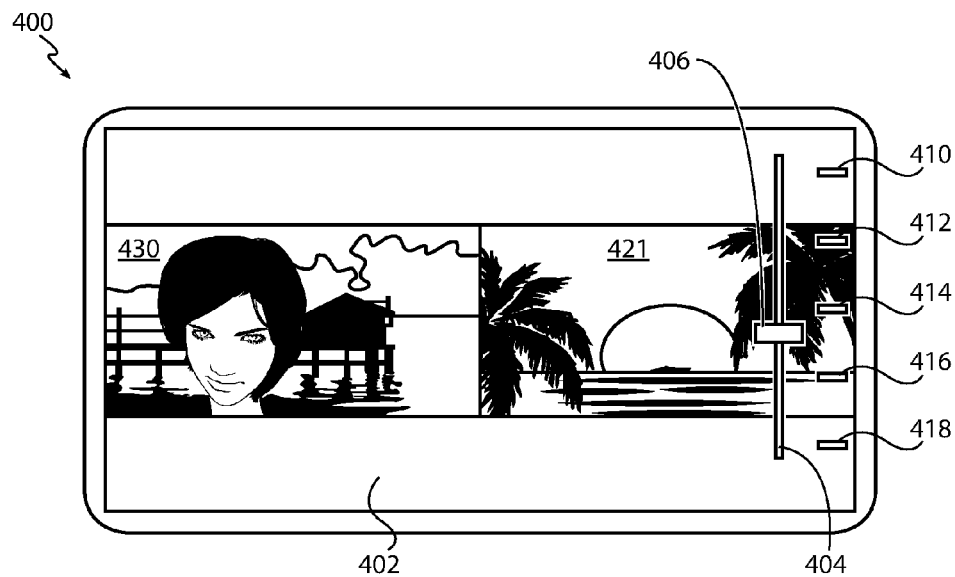

FIG. 4E illustrates camera information 421 and 430 displayed on display 402 in a dual view mode. In the example of FIG. 4E, camera information 421 is representative of camera information received from the first camera module comprised by apparatus 400. It can be seen that slider interface element 406 is positioned between zoom indicators 414 and 416 nearer to zoom indicator 414. Such positioning of slider interface element 406 may be indicative of a zoomed in view of the camera information received from the first camera module comprised by apparatus 400, and a zoomed out view of the camera information received from the second camera module comprised by apparatus 400.

Figure 4F:
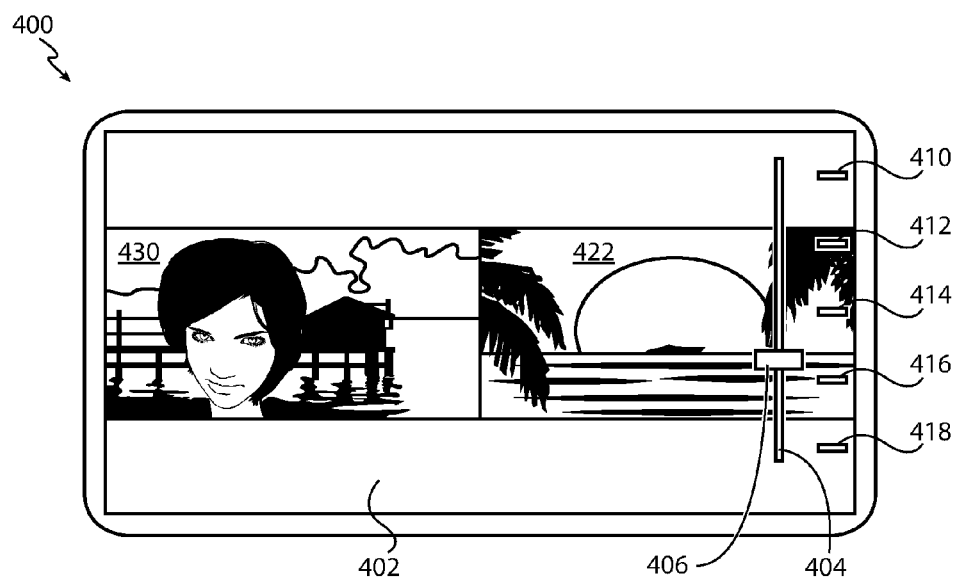

FIG. 4F illustrates camera information 422 and 430 displayed on display 402 in a dual view mode. In the example of FIG. 4F, camera information 422 is representative of camera information received from the first camera module comprised by apparatus 400. It can be seen that slider interface element 406 is positioned between zoom indicators 414 and 416, nearer to zoom indicator 416. Such positioning of slider interface element 406 may be indicative of a more zoomed in view of the camera information received from the first camera module comprised by apparatus 400 with respect to camera information 421, and a zoomed out view of the camera information received from the second camera module comprised by apparatus 400.

As previously described, a zoom input may be indicative of zooming beyond a dual view zoom out threshold. In at least one example embodiment, the apparatus determines that the zoom input is indicative of zooming beyond the dual view mode zoom out threshold, causes zooming out of the second camera information in accordance with the dual view mode zoom out threshold, and causes zooming in of the first camera information. In this manner, the zooming out and zooming in may be based, at least in part, on the zoom input.

For example, apparatus 400 may be displaying camera information similar to camera information 432 as illustrated in FIG. 4B. Apparatus 400 may receive information indicative of a zoom input such that slider interface element 406 changes position from the position illustrated in FIG. 4B to the position illustrated in FIG. 4E. Such a zoom input may cause display of camera information similar to camera information 421 and 430 on display 402. In another example, the zoom input may continue in the zoom direction such that such that zoom slider interface element 406 changes position from the position illustrated in FIG. 4E to the position illustrated in FIG. 4F. In such an example, apparatus 400 may display camera information similar to camera information 422 as illustrated in FIG. 4E.

Figure 4G:
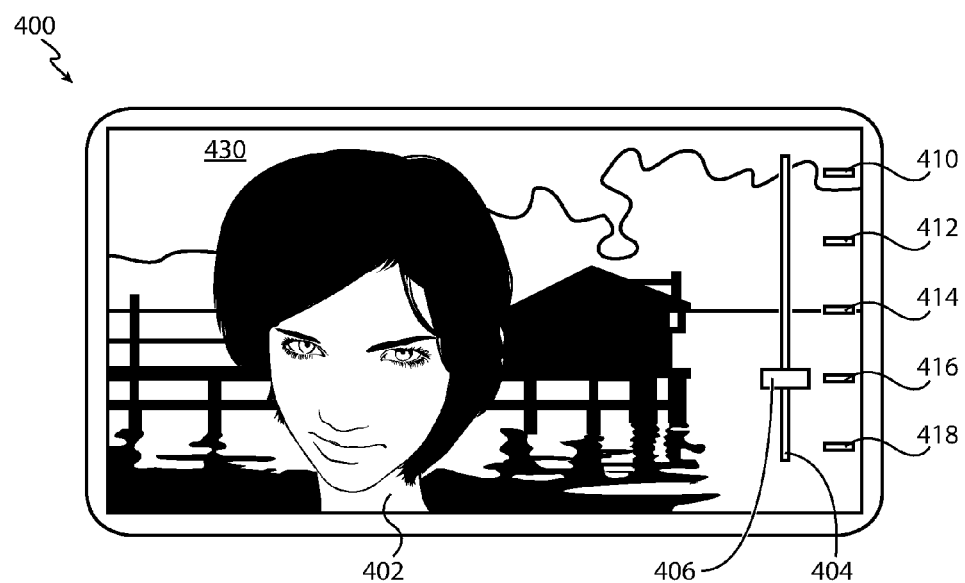

FIG. 4G illustrates camera information 430 displayed on display 402 in a single view mode. It can be seen that slider interface element 406 is positioned near zoom level indicator 416. Such positioning of slider interface element 406 may be indicative of a zoomed out view of the camera information received from the second camera module comprised by apparatus 400.

As previously described, a zoom input may be indicative of zooming within a different zoom out threshold. In at least one example embodiment, the apparatus determines determination that the zoom input is indicative of within the different zoom out threshold, terminates display of the first camera information, and causes display of the second camera information in a second camera information single view mode. In this manner, the display of the second camera information in a single view mode may be based, at least in part, on the zoom input. For example, apparatus 400 may be displaying camera information similar to camera information 420 and camera information 430 as illustrated in FIG. 4D. Apparatus 400 may receive information indicative of a zoom input such that slider interface element 406 changes position from the position illustrated in FIG. 4D to the position illustrated in FIG. 4G. Such a zoom input may cause display of camera information similar to camera information 430 on display 402 in a second camera information single view mode.

FIGS. 5A-5G are diagrams illustrating display of camera information according to at least one example embodiment. The examples of FIGS. 5A-5G are merely examples and do not limit the scope of the claims. For example, the camera information sizes may vary, the dual view mode may vary, the zoom input may vary, and/or the like.

As previously described, in at least some circumstances, it may be desirable to display camera information received from multiple camera modules simultaneously, such as in a dual view mode. In some circumstances, it may be desirable to display the camera information conforming to a camera information size when the camera information is displayed in a dual view mode relative to the zoom level of the camera information. For example, the display of the camera information may be animated such that the displayed camera information is sized up or down as the camera information is zoomed out or in. In this manner, the user may more easily recognize which camera information is being zoomed when the camera information is displayed in a dual view mode.

FIGS. 5A-5G illustrate apparatus 500. Apparatus 500 comprises a first camera module configured to face in a first camera direction, a second camera module configured to face in a second camera direction, and display 502 configured to display camera information received from the first camera module and the second camera module. The first camera direction of apparatus 500 is substantially opposite from the second camera direction of apparatus 500. The first camera direction of apparatus 500 is substantially opposite to the direction faced by display 502. The second camera direction of apparatus 500 substantially corresponds with the direction faced by display 502. It can be seen that display 502 is displaying slider interface 504. Slider interface 504 comprises slider interface element 506 and zoom indicators 510, 512, 514, 516, and 518. The position of slider interface element 506 with respect to zoom indicators 510, 512, 514, 516, and 518 may be indicative of various zoom levels associated with the first camera module and the second camera module.

As previously described, in some circumstances, a zoom input may have a zoom out threshold associated with a particular camera module. Zoom indicator 512 corresponds with a zoom out threshold corresponding with the first camera module. Zoom indicator 516 corresponds with a different zoom out threshold corresponding with the second camera module.

As previously described, in some circumstances, a zoom input may be indicative of zooming within the zoom out threshold. For example, a zoom input that results in a position of slider interface element 506 between zoom level indicators 510 and 512 may be indicative of zooming within the zoom out threshold associated with the first camera module. In such an example, a zoom input that results in a position of slider interface element 506 between zoom indicator 512 and 518 may not result in zooming out of the camera information received from the first camera module beyond a zoom level corresponding with zoom indicator 516. In such an example, the zoom input may be indicative of zooming beyond the zoom out threshold.

In another example, a zoom input that results in a position of slider interface element 306 between zoom indicators 516 and 518 may be indicative of zooming within the different zoom out threshold associated with the second camera module. In such an example, a zoom input that results in a position of slider interface element 506 between zoom indicator 510 and 516 may not result in zooming out of the camera information received from the second camera module beyond a zoom level corresponding with zoom indicator 516. In such an example, the zoom input may be indicative of zooming beyond the different zoom out threshold.

As previously described, in at least some circumstances, a zoom input may have a dual view zoom out threshold. In the example of FIGS. 5A-5G, zoom indicator 514 corresponds with both a dual view zoom out threshold corresponding with the first camera module and a different dual view mode zoom out threshold corresponding with the second camera module.

As previously described, in some circumstances, a zoom input may be indicative of zooming within the dual view zoom out threshold. For instance, a zoom input that results in a position of slider interface element 506 between zoom indicators 514 and 516 may be indicative of zooming within the zoom out threshold associated with the first camera module. In such an example, a zoom input that results in a position of slider interface element 506 between zoom indicator 512 and 514 may not result in zooming out of the camera information received from the first camera module beyond a zoom level corresponding with zoom indicator 514. In such an example, the zoom input may be indicative of zooming beyond the zoom out threshold.

In another example, a zoom input that results in a position of slider interface element 506 between zoom indicators 512 and 514 may be indicative of zooming within the different dual view zoom out threshold associated with the second camera module. In such an example, a zoom input that results in a position of slider interface element 506 between zoom indicator 514 and 516 may not result in zooming out of the camera information received from the second camera module beyond a zoom level corresponding with zoom indicator 514. In such an example, the zoom input may be indicative of zooming beyond the different dual view zoom out threshold.

Figure 5A:
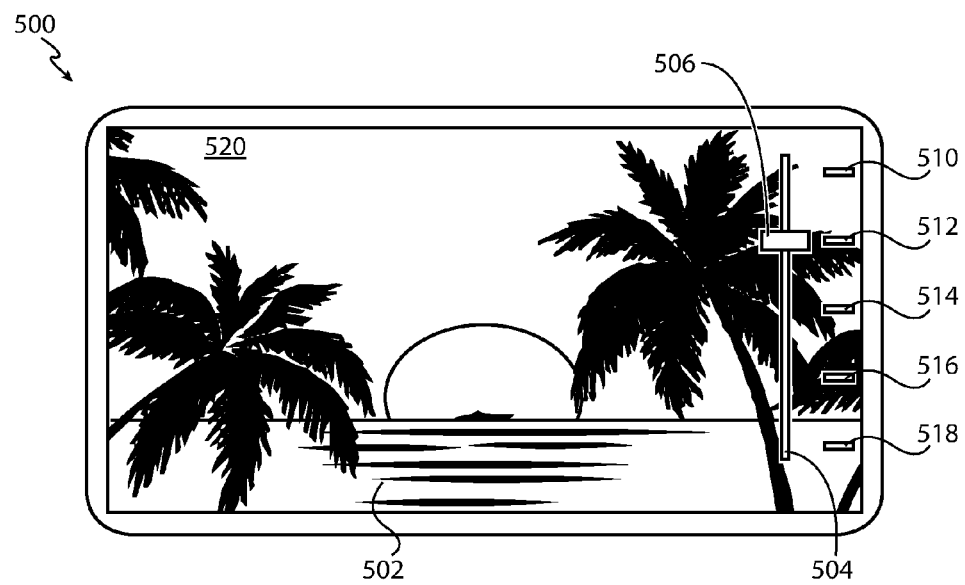
FIGS. 5A-5G are diagrams illustrating display of camera information according to at least one example embodiment.

FIG. 5A illustrates camera information 520 displayed on display 502 in a single view mode. In the example of FIG. 5A, camera information 520 is representative of camera information received from the first camera module comprised by apparatus 500. It can be seen that slider interface element 506 is positioned near zoom indicator 512. Such positioning of slider interface element 506 may be indicative of a zoomed out view of the camera information received from the first camera module comprised by apparatus 500.

Figure 5B:
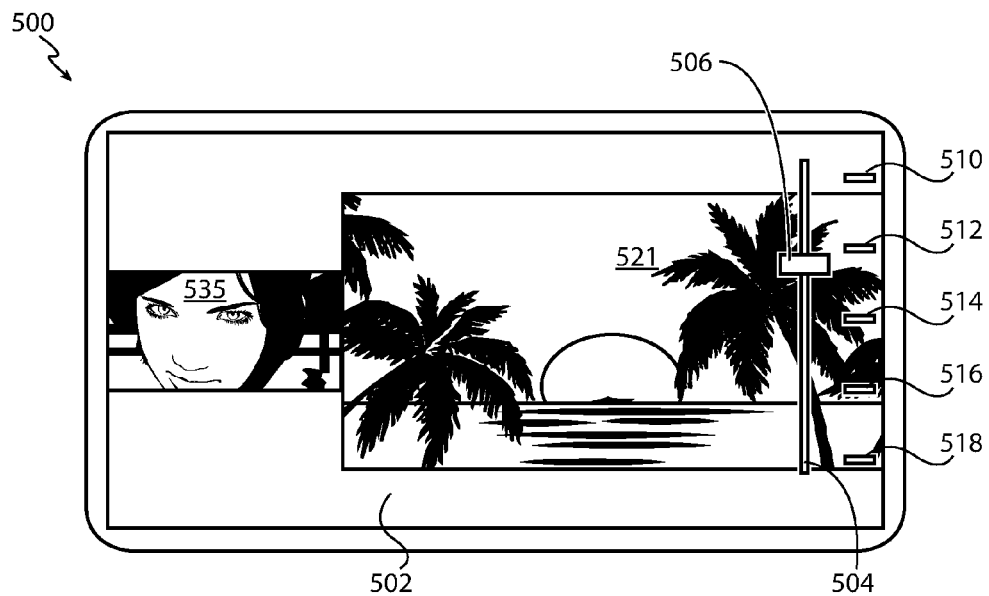

FIG. 5B illustrates camera information 521 and 535 displayed on display 502 in a dual view mode. In the example of FIG. 5B, camera information 521 is representative of camera information received from the first camera module comprised by apparatus 500. In the example of FIG. 5B, camera information 521 has a camera information size that is directly proportional to the zoom level of the camera information received from the second camera module. In the example of FIG. 5B camera information 535 is representative of camera information received from the second camera module comprised by apparatus 500. In the example of FIG. 5B, camera information 535 has a camera information size that is inversely proportional to the zoom level of the camera information received from the second camera module. It can be seen that slider interface element 506 is positioned between zoom indicators 512 and 514 nearer to zoom indicator 512. Such positioning of slider interface element 506 may be indicative of a zoomed out view of the camera information received from the first camera module comprised by apparatus 500, and a zoomed in view of the camera information received from the second camera module comprised by apparatus 500.

As previously described, it may be desirable to allow a user to alternate between a single view mode and a dual view mode. As previously described, in some circumstances, it may be desirable to, control alternation between a single view mode and a dual view mode by the zoom input. As previously described, it may be desirable to display the camera information conforming to a camera information size when the camera information is displayed in a dual view mode relative to the zoom level of the camera information. In at least one example embodiment, prior to the determination that the zoom input is indicative of zooming beyond the dual view mode zoom out threshold, the apparatus determines a second camera information size that is inversely proportional to a zoom level of the second camera information, and determines a first camera information size that is directly proportional to the zoom level of the second camera information In this manner, the causation of display of the second camera information in the dual view mode may be performed such that the second camera information conforms to the second camera information size; and the causation of display of the first camera information in the dual view mode may be performed such that the first camera information conforms to the first camera information size.

For example, apparatus 500 may be displaying camera information similar to camera information 520 as illustrated in FIG. 5A. Apparatus 500 may receive information indicative of a zoom input such that slider interface element 506 changes position from the position illustrated in FIG. 5A to the position illustrated in FIG. 5B. Such a zoom input may be indicative of zooming beyond the zoom out threshold of the first camera information. This may cause apparatus 500 to display at least part of the first camera information and at least part of the second camera information in a dual view mode camera information similar to camera information 521 and 535 on display 502.

Figure 5C:
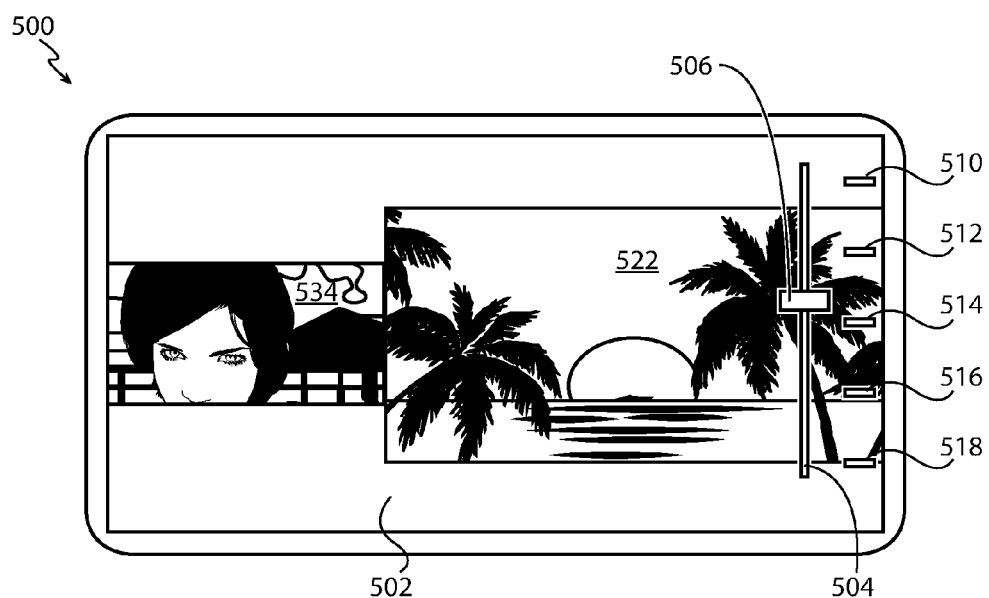

FIG. 5C illustrates camera information 522 and 534 displayed on display 502 in a dual view mode. In the example of FIG. 5C, camera information 522 is representative of camera information received from the first camera module comprised by apparatus 500. In the example of FIG. 5C camera information 522 has a camera information size that is directly proportional to the zoom level of the camera information received from the second camera module. In the example of FIG. 5C camera information 534 is representative of camera information received from the second camera module comprised by apparatus 500. In the example of FIG. 5C camera information 534 has a camera information size that is inversely proportional to the zoom level of the camera information received from the second camera module. It can be seen that slider interface element 506 is positioned between zoom indicators 512 and 514 nearer to zoom indicator 514. Such positioning of slider interface element 506 may be indicative of a zoomed out view of the camera information received from the first camera module comprised by apparatus 500, and a less zoomed in view of the camera information received from the second camera module comprised by apparatus 500 with respect to camera information 535.

Figure 5D:
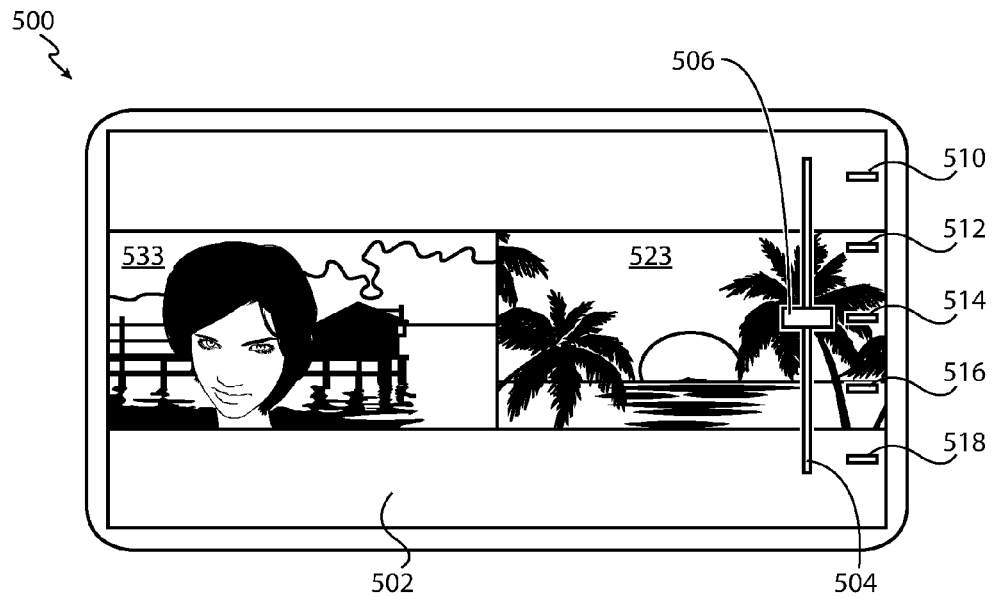

FIG. 5D illustrates camera information 523 and 533 displayed on display 502 in a dual view mode. In the example of FIG. 5D, camera information 523 is representative of camera information received from the first camera module comprised by apparatus 500. In the example of FIG. 5D, camera information 523 has a camera information size that is directly proportional to the zoom level of the camera information received from the second camera module. In the example of FIG. 5D, camera information 533 is representative of camera information received from the second camera module comprised by apparatus 500. In the example of FIG. 5D, camera information 533 has a camera information size that is inversely proportional to the zoom level of the camera information received from the second camera module. It can be seen that slider interface element 506 is positioned approximately at level indicator 514. Such positioning of slider interface element 506 may be indicative of a zoomed out view of the camera information received from the first camera module comprised by apparatus 500, and a zoomed out view of the camera information received from the second camera module comprised by apparatus 500.

As previously described, it may be desirable to allow a user to alternate between a single view mode and a dual view mode. As previously described, in some circumstances, it may be desirable to control alternation between a single view mode and a dual view mode by the zoom input. As previously described, it may be desirable to display the camera information conforming to a camera information size when the camera information is displayed in a dual view mode relative to the zoom level of the camera information.

In at least one example embodiment, prior to the determination that the zoom input is indicative of zooming beyond the dual view mode zoom out threshold, the apparatus determines a second camera information size that is inversely proportional to a zoom level of the second camera information, and determines a first camera information size that is directly proportional to the zoom level of the second camera information. In this manner, the causation of display of the second camera information in the dual view mode may be performed such that the second camera information conforms to the second camera information size; and the causation of display of the first camera information in the dual view mode may be performed such that the first camera information conforms to the first camera information size.

For example, apparatus 500 may be displaying camera information similar to camera information 520 as illustrated in FIG. 5A. Apparatus 500 may receive information indicative of a zoom input such that slider interface element 506 changes position from the position illustrated in FIG. 5A to the position illustrated in FIG. 5B. Such a zoom input may be indicative of zooming beyond the zoom out threshold of the first camera information. This may cause apparatus 500 to display at least part of the first camera information and at least part of the second camera information in a dual view mode camera information similar to camera information 521 and 535 on display 502.

In another example, apparatus 500 may be displaying camera information similar to camera information 521 and camera information 535 as illustrated in FIG. 5B. Apparatus 500 may receive information indicative of a zoom input such that slider interface element 506 changes position from the position illustrated in FIG. 5B to the position illustrated in FIG. 5C. Such a zoom input may cause display of camera information similar to camera information 522 and 534 on display 502. In another example, apparatus 500 may be displaying camera information similar to camera information 522 and camera information 534 as illustrated in FIG. 5C. Apparatus 500 may receive information indicative of a zoom input such that slider interface element 506 changes position from the position illustrated in FIG. 5C to the position illustrated in FIG. 5D. Such a zoom input may cause display of camera information similar to camera information 533 and 523 on display 502.

Figure 5E:
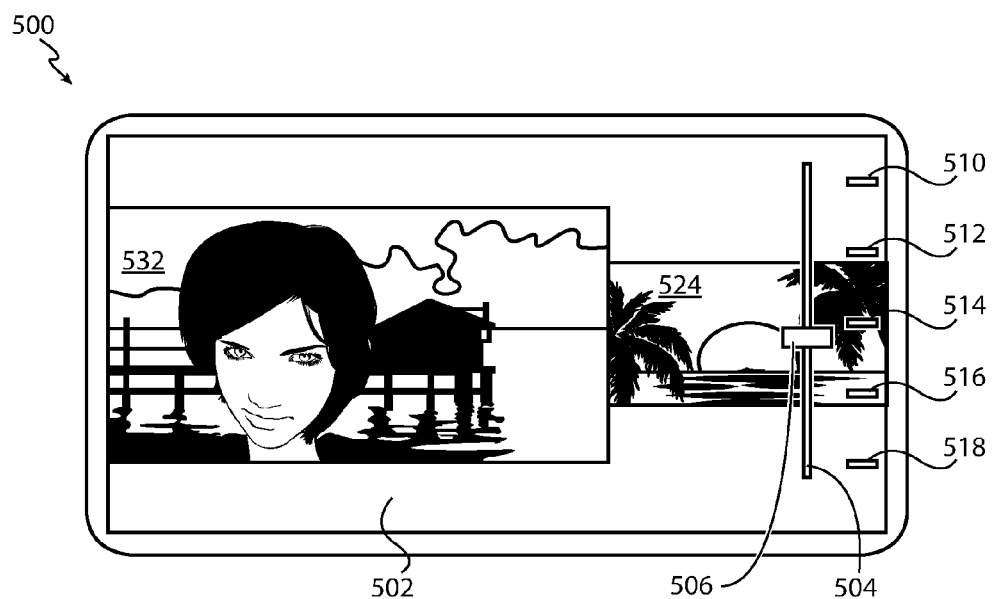

FIG. 5E illustrates camera information 524 and 532 displayed on display 502 in a dual view mode. In the example of FIG. 5E, camera information 524 is representative of camera information received from the first camera module comprised by apparatus 500. In the example of FIG. 5E, camera information 524 has a camera information size that is inversely proportional to a zoom level of the camera information received from the first camera module. In the example of FIG. 5E, camera information 532 is representative of camera information received from the second camera module comprised by apparatus 500. In the example of FIG. 5E, camera information 532 has a camera information size that is directly proportional to the zoom level of the camera information received from the first camera module. It can be seen that slider interface element 506 is positioned between zoom indicators 514 and 516 nearer to zoom indicator 514. Such positioning of slider interface element 506 may be indicative of a zoomed in view of the camera information received from the first camera module comprised by apparatus 500, and a zoomed out view of the camera information received from the second camera module comprised by apparatus 500.

Figure 5F:
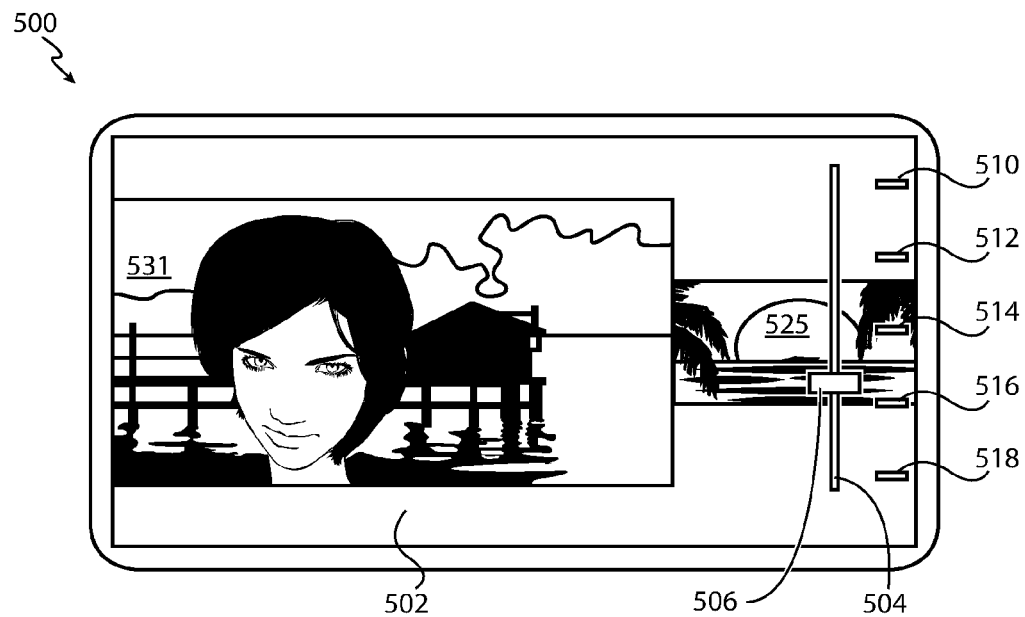

FIG. 5F illustrates camera information 525 and 531 displayed on display 502 in a dual view mode. In the example of FIG. 5F, camera information 525 is representative of camera information received from the first camera module comprised by apparatus 500. In the example of FIG. 5F, camera information 525 has a camera information size that is inversely proportional to a zoom level of the camera information received from the first camera module. In the example of FIG. 5F, camera information 531 is representative of camera information received from the second camera module comprised by apparatus 500. In the example of FIG. 5F, camera information 531 has a camera information size that is directly proportional to the zoom level of the camera information received from the first camera module. It can be seen that slider interface element 506 is positioned between zoom indicators 514 and 516 nearer to zoom indicator 516. Such positioning of slider interface element 506 may be indicative of a more zoomed in view of the camera information received from the first camera module comprised by apparatus 500 with respect to camera information 521, and a zoomed out view of the camera information received from the second camera module comprised by apparatus 500.

As previously described, a zoom input may be indicative of zooming beyond a dual view zoom out threshold. In at least one example embodiment, subsequent to the determination that the zoom input is indicative of zooming beyond the dual view mode zoom out threshold, the apparatus determines a first camera information size that is inversely proportional to a zoom level of the first camera information, determines a second camera information size that is directly proportional to the zoom level of the first camera information. In this manner, the causation of display of the first camera information in the dual view mode may be performed such that the first camera information conforms to the first camera information size, and the causation of display of the second camera information in the dual view mode is performed such that the second camera information conforms to the second camera information size.

For example, apparatus 500 may be displaying camera information similar to camera information 523 and camera information 533 as illustrated in FIG. 5D. Apparatus 500 may receive information indicative of a zoom input such that slider interface element 506 changes position from the position illustrated in FIG. 5D to the position illustrated in FIG. 5E. Such a zoom input may cause display of camera information similar to camera information 524 and 532 on display 502. In another example, the user may continue the zoom input in the zoom direction such that zoom slider interface element 506 changes position from the position illustrated in FIG. 5E to the position illustrated in FIG. 5F. In such an example, apparatus 500 may display camera information similar to camera information 525 and 531 as illustrated in FIG. 5F.

Figure 5G:
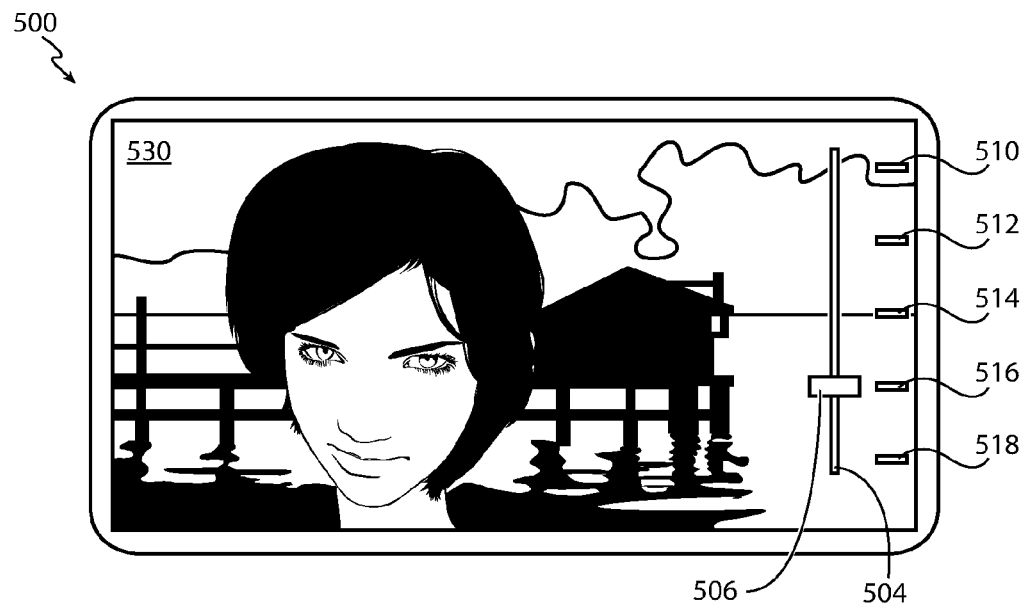

FIG. 5G illustrates camera information 530 displayed on display 502 in a single view mode. In the example of FIG. 5G, camera information 530 is representative of camera information received from the second camera module comprised by apparatus 500. It can be seen that slider interface element 506 is positioned near zoom indicator 516. Such positioning of slider interface element 506 may be indicative of a zoomed out view of the camera information received from the second camera module comprised by apparatus 500.

As previously described, a zoom input may be indicative of zooming within a different zoom out threshold that causes display of the second camera information in a second camera information single view mode. For example, apparatus 500 may be displaying camera information similar to camera information 525 and camera information 531 as illustrated in FIG. 5F. Apparatus 500 may receive information indicative of a zoom input such that slider interface element 506 changes position from the position illustrated in FIG. 5F to the position illustrated in FIG. 5G. Such a zoom input may cause display of camera information similar to camera information 530 on display 502 in a second camera information single view mode.

Figure 6:
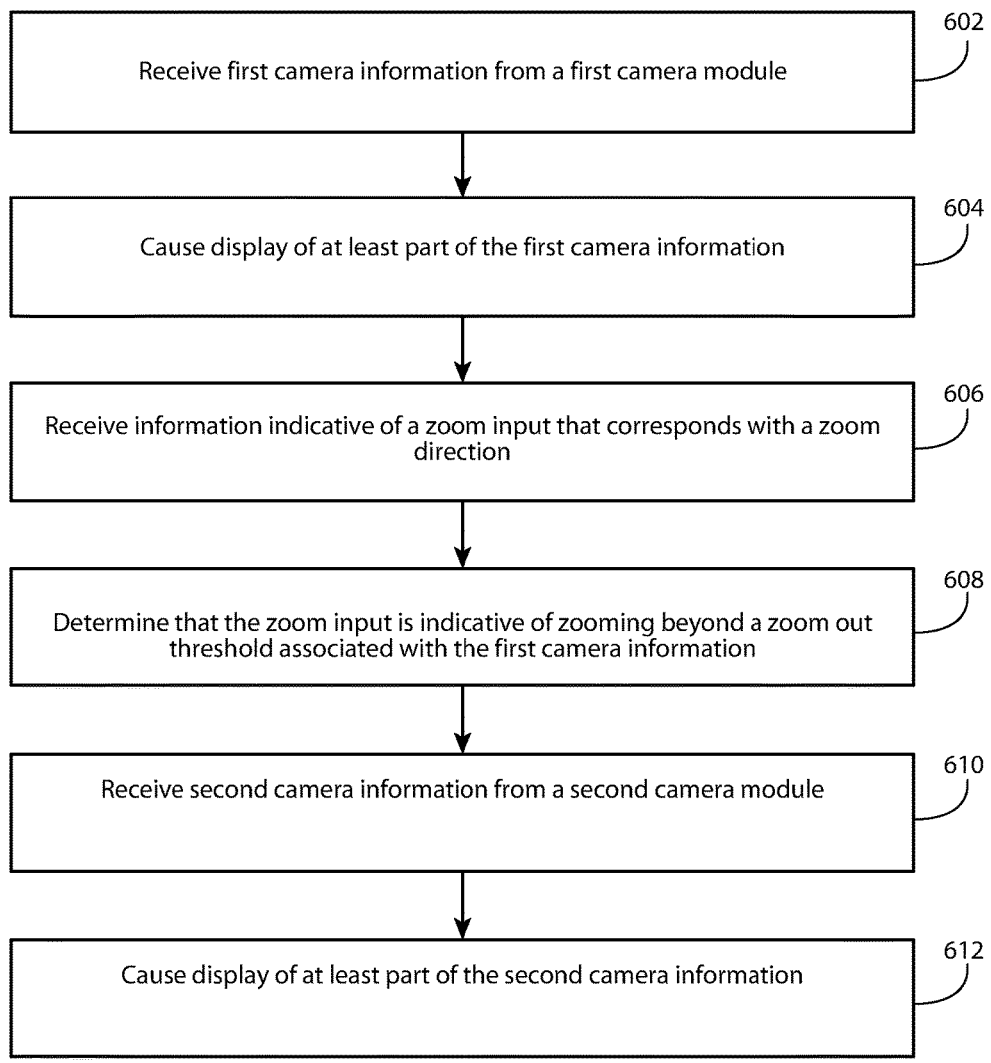
FIG. 6 is a flow diagram illustrating activities associated with display of camera information according to at least one example embodiment.

FIG. 6 is a flow diagram illustrating activities associated with display of camera information according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus receives first camera information from a first camera module. The receipt, the camera information, and the camera module may be similar as described regarding FIG. 1, FIG. 2, and FIGS. 3A-3D.

At block 604, the apparatus causes display of at least part of the first camera information. The display may be similar as described regarding FIGS. 3A-3D.

At block 606, the apparatus receives information indicative of a zoom input that corresponds with a zoom direction. The zoom input signifies zooming out of the first camera information. The receipt, the zoom input, the zoom direction, and the zooming out may be similar as described regarding FIGS. 3A-3D.

At block 608, the apparatus determines that the zoom input is indicative of zooming beyond a zoom out threshold associated with the first camera information. The determination, the zooming, and the zoom out threshold may be similar as described regarding FIGS. 3A-3D.

At block 610, the apparatus receives second camera information from a second camera module. In this manner, the apparatus may receive the second camera information based, at least in part, on the determination that the zoom input is indicative of zooming beyond the zoom out threshold. The receipt, the camera information, and the camera module may be similar as described regarding FIG. 1, FIG. 2, and FIGS. 3A-3D.

At block 612, the apparatus causes display of at least part of the second camera information. The display may be similar as described regarding FIGS. 3A-3D.

Figure 7:
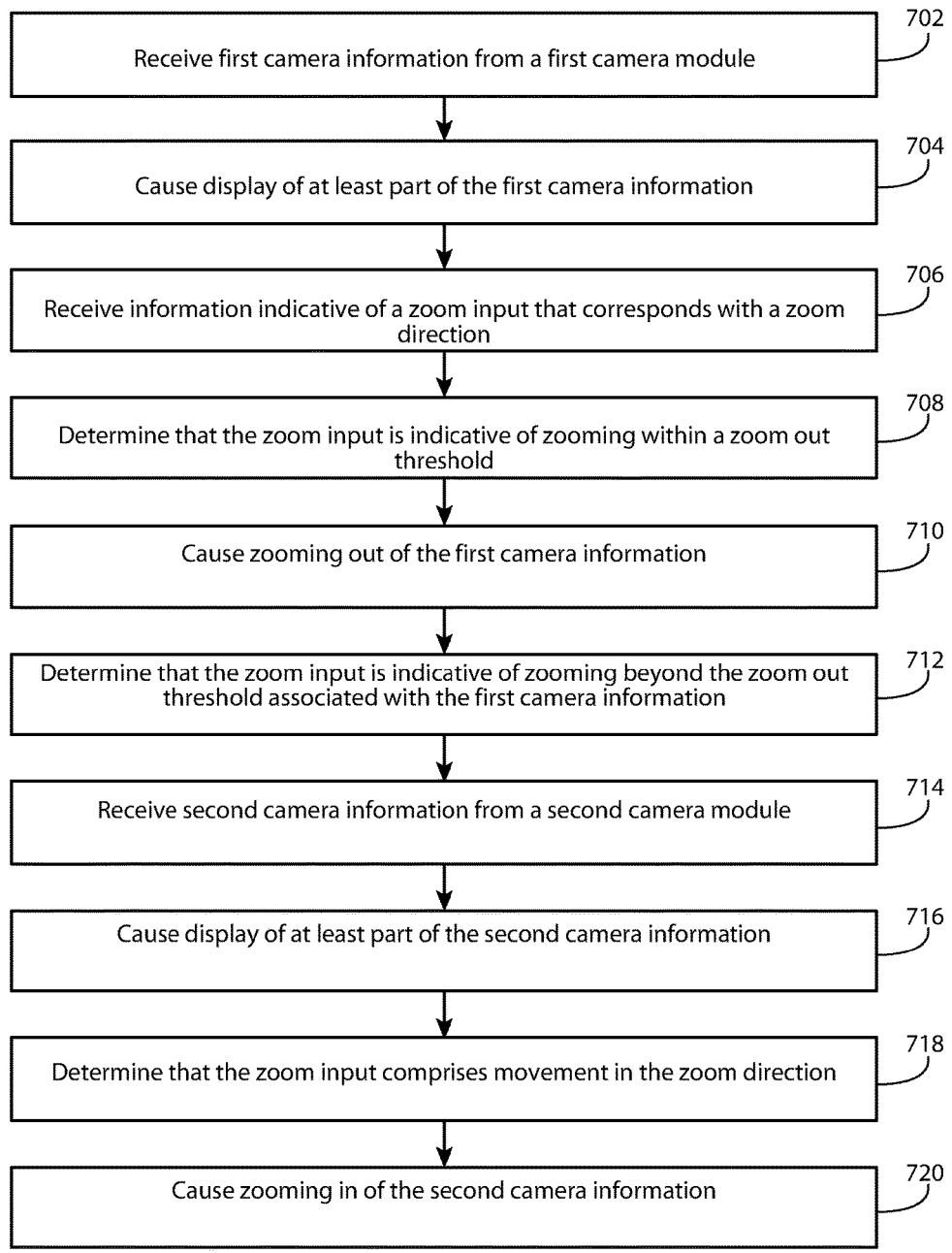
FIG. 7 is a flow diagram illustrating activities associated with zooming of camera information according to at least one example embodiment.

FIG. 7 is a flow diagram illustrating activities associated with zooming of camera information according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously described, it may be desirable to determine that a zoom input is indicative of zooming within a zoom out threshold. In this manner, the apparatus may cause zooming out of camera information based on the determination the zoom input is indicative of zooming within the zoom out threshold.

At block 702, the apparatus receives first camera information from a first camera module, similarly as described regarding block 602 of FIG. 6. At block 704, the apparatus causes display of at least part of the first camera information, similarly as described regarding block 604 of FIG. 6. At block 706, the apparatus receives information indicative of a zoom input that corresponds with a zoom direction, similarly as described regarding block 606 of FIG. 6.

At block 708, the apparatus determines that the zoom input is indicative of zooming within a zoom out threshold. The determination, the zooming, and the zoom out threshold may be similar as described regarding FIGS. 3A-3D.

At block 710, the apparatus causes zooming out of the first camera information. In this manner, the zooming out may be based, at least in part, on the zoom input. The zooming out may be similar as described regarding FIGS. 3A-3D.

At block 712, the apparatus determines that the zoom input is indicative of zooming beyond a zoom out threshold associated with the first camera information, similarly as described regarding block 608 of FIG. 6. At block 714, the apparatus receives second camera information from a second camera module, similarly as described regarding block 610 of FIG. 6. At block 716, the apparatus causes display of at least part of the second camera information, similarly as described regarding block 612 of FIG. 6.

At block 718, the apparatus determines that the zoom input comprises movement in the zoom direction. The determination and the movement may be similar as described regarding FIGS. 3A-3D.

At block 720, the apparatus causes zooming in of the second camera information. In this manner, the zooming in may be based, at least in part, on the movement in the zoom direction. The zooming in may be similar as described regarding FIGS. 3A-3D.

Figure 8:
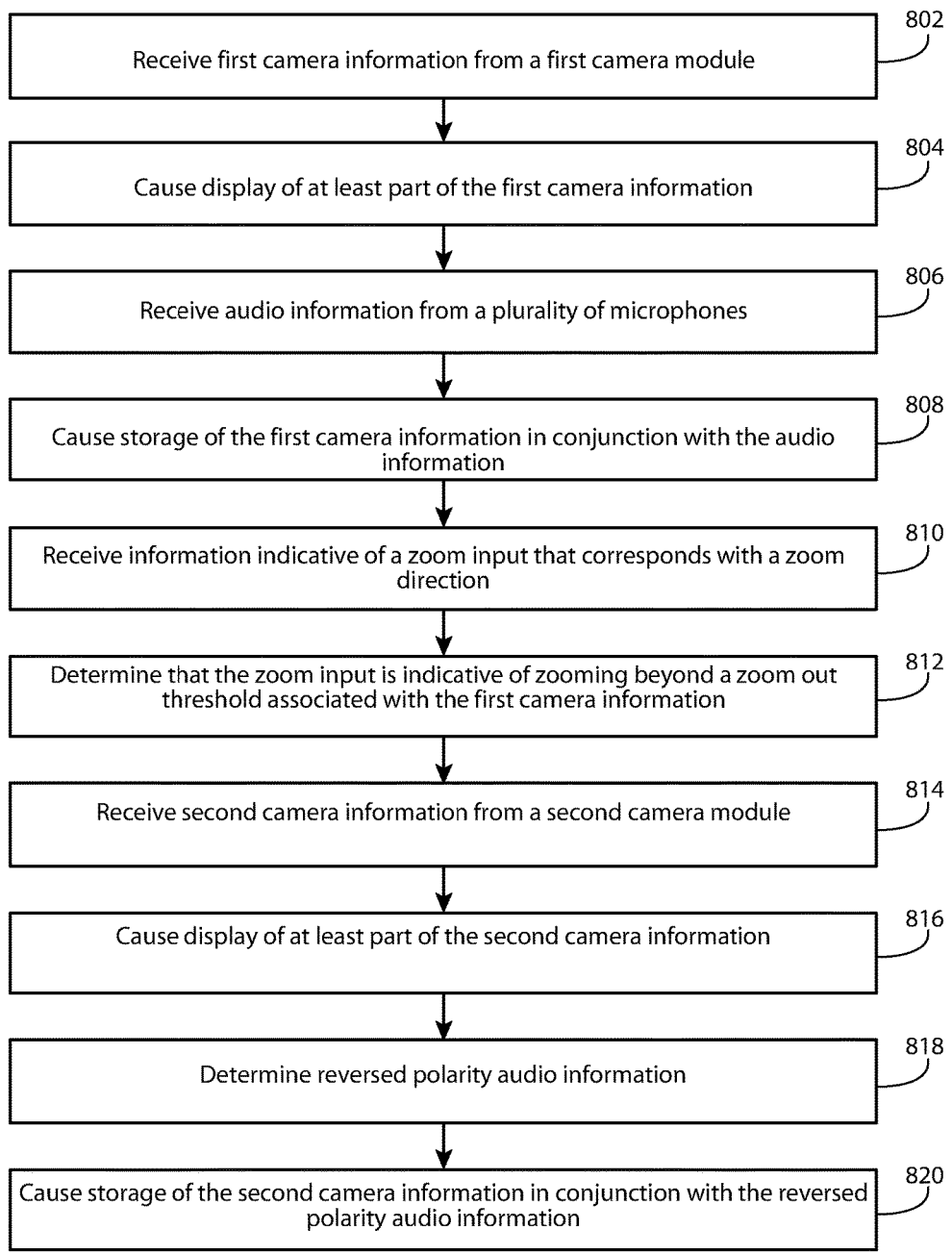
FIG. 8 is a flow diagram illustrating activities associated with storage of camera information in conjunction with audio information according to at least one example embodiment.

FIG. 8 is a flow diagram illustrating activities associated with storage of camera information in conjunction with audio information according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, the apparatus may comprise a microphone. In certain circumstances, it may be desirable to receive audio information from the microphone. For example, the user may desire to store the audio information in conjunction with camera information. In certain circumstances, it may be desirable for the apparatus to comprise a plurality of microphones. For example, the apparatus may use multiple microphones to perform audio zooming. For instance, the apparatus may focus the direction of the microphones in correspondence with a particular camera direction such that the audio information corresponds with the particular camera direction. For example, it may be desirable to reverse polarity of audio information when transitioning from a camera module to a different camera module. For example, as previously described, the apparatus may comprise a camera module that is oriented in a particular direction and an opposite camera module that is oriented in an opposite direction from the particular direction. In such an example, it may be desirable to reverse the polarity of audio channels upon a transition between the camera module and the opposite camera module. In this manner, such reversal of polarity during receipt of the audio information may avoid a harsh reversal of the audio channels as perceived during playback. For example, such a transition between the camera module and the opposite camera module may involve a reversal of which microphones indicate a direction that is leftward of the camera module information and that is rightward of the camera module information. In such circumstances, it may be desirable to avoid such a perceived reversal during playback by way of a reversal of such audio channels during receipt of the audio information. In at least one example embodiment, the apparatus determines reversed polarity audio information such that a leftward channel of the reversed polarity audio information corresponds with a rightward channel of received audio information and a rightward channel of the reversed polarity audio information corresponds with a leftward channel of the received audio information.

At block 802, the apparatus receives first camera information from a first camera module, similarly as described regarding block 602 of FIG. 6. At block 804, the apparatus causes display of at least part of the first camera information, similarly as described regarding block 604 of FIG. 6.

At block 806, the apparatus receives audio information from a plurality of microphones. The audio information comprises at least a first audio channel and a second audio channel.

At block 808, the apparatus causes storage of the first camera information in conjunction with the audio information.

At block 810, the apparatus receives information indicative of a zoom input that corresponds with a zoom direction, similarly as described regarding block 606 of FIG. 6. At block 812, the apparatus determines that the zoom input is indicative of zooming beyond a zoom out threshold associated with the first camera information, similarly as described regarding block 608 of FIG. 6. At block 814, the apparatus receives second camera information from a second camera module, similarly as described regarding block 610 of FIG. 6. At block 816, the apparatus causes display of at least part of the second camera information, similarly as described regarding block 612 of FIG. 6.

At block 818, the apparatus determines reversed polarity audio information. The reversed polarity audio information is such that a first channel of the reversed polarity audio information corresponds with the second channel of the audio information and a second channel of the reversed polarity audio information corresponds with the first channel of the audio information.

At block 820, the apparatus causes storage of the second camera information in conjunction with the reversed polarity audio information.

Figure 9:
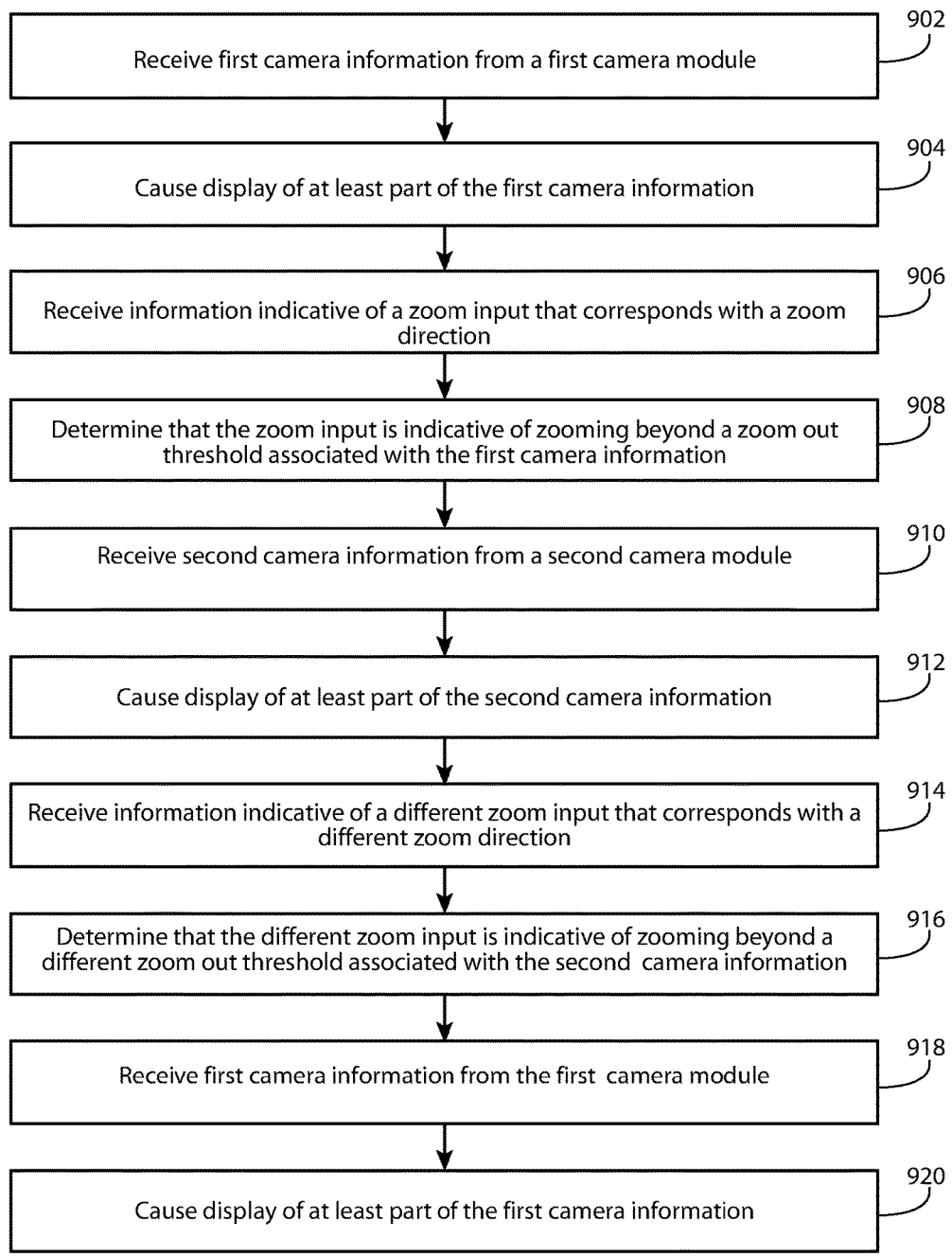
FIG. 9 is a flow diagram illustrating activities associated with display of camera information according to at least one example embodiment.

FIG. 9 is a flow diagram illustrating activities associated with display of camera information according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, it may be desirable to perform the interactions described in FIGS. 3A-3D in a reverse direction. Such reverse direction interactions may be initiated by receipt of information indicative of a different zoom input that corresponds with a different zoom direction that is substantially opposite from the zoom direction.

At block 902, the apparatus receives first camera information from a first camera module, similarly as described regarding block 602 of FIG. 6. At block 904, the apparatus causes display of at least part of the first camera information, similarly as described regarding block 604 of FIG. 6. At block 906, the apparatus receives information indicative of a zoom input that corresponds with a zoom direction, similarly as described regarding block 606 of FIG. 6. At block 908, the apparatus determines that the zoom input is indicative of zooming beyond a zoom out threshold associated with the first camera information, similarly as described regarding block 608 of FIG. 6. At block 910, the apparatus receives second camera information from a second camera module, similarly as described regarding block 610 of FIG. 6. At block 912, the apparatus causes display of at least part of the second camera information, similarly as described regarding block 612 of FIG. 6.

At block 914, the apparatus receives information indicative of a different zoom input that corresponds with a different zoom direction. The different zoom direction is substantially opposite from the zoom direction. The receipt, the different zoom input, and the different zoom direction may be similar as described regarding FIGS. 3A-3D.

At block 916, the apparatus determines that the different zoom input is indicative of zooming beyond a different zoom out threshold that is associated with the second camera information. The determination, the zooming, and the different zoom out threshold may be similar as described regarding FIGS. 3A-3D.

At block 918, the apparatus receives first camera information from the first camera module. In this manner, the receipt may be based, at least in part, on the determination that the different zoom input is indicative of zooming beyond the different zoom out threshold. The receipt and the camera information may be similar as described regarding FIGS. 3A-3D.

At block 920, the apparatus causes display of at least part of the first camera information. The display may be similar as described regarding FIGS. 3A-3D.

Figure 10:
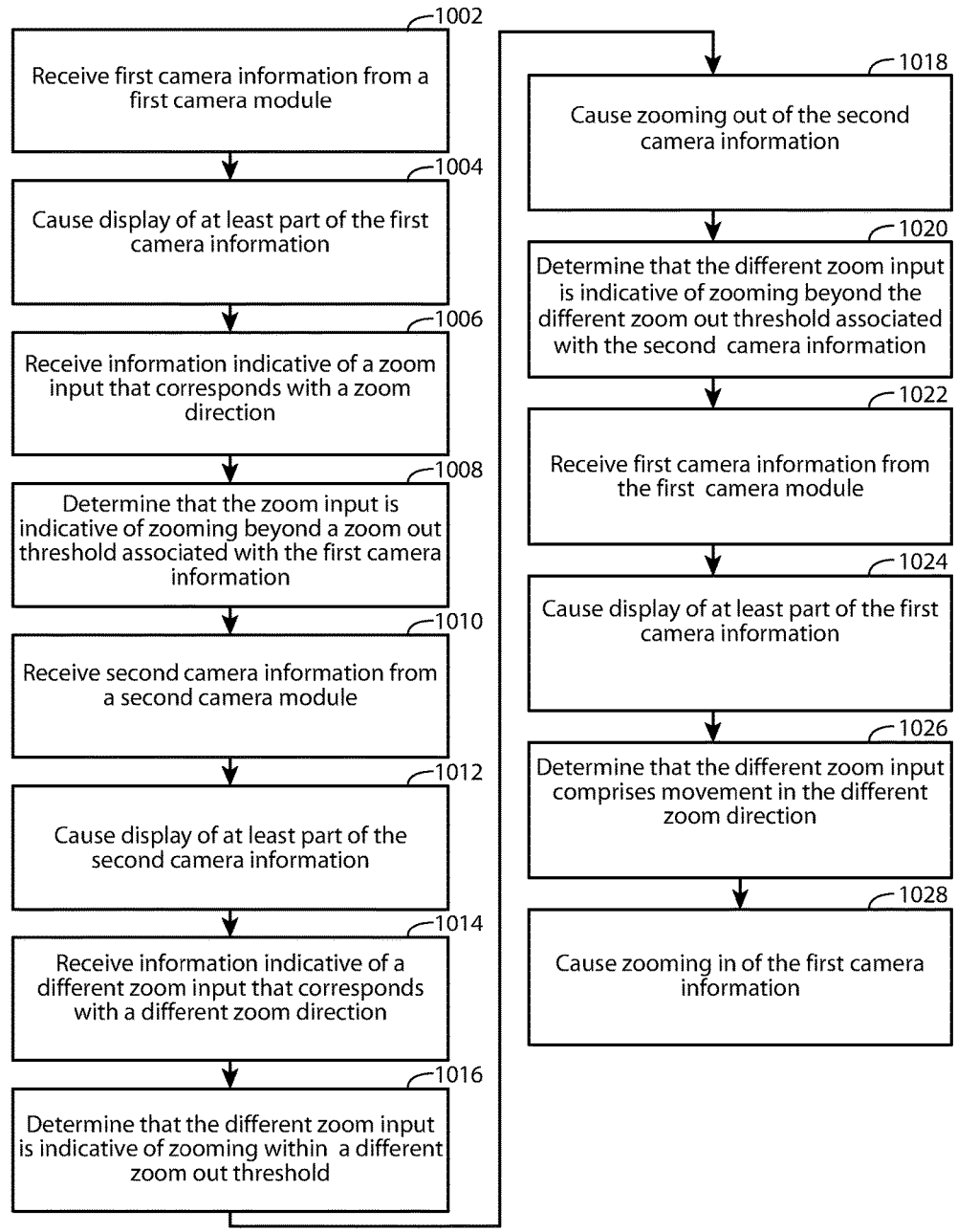
FIG. 10 is a flow diagram illustrating activities associated with zooming of camera information according to at least one example embodiment.

FIG. 10 is a flow diagram illustrating activities associated with zooming of camera information according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, it may be desirable to perform the interactions described in FIGS. 3A-3D in a reverse direction. Such reverse direction interactions may be initiated by receipt of information indicative of a different zoom input that corresponds with a different zoom direction that is substantially opposite from the zoom direction.

At block 1002, the apparatus receives first camera information from a first camera module, similarly as described regarding block 602 of FIG. 6. At block 1004, the apparatus causes display of at least part of the first camera information, similarly as described regarding block 604 of FIG. 6. At block 1006, the apparatus receives information indicative of a zoom input that corresponds with a zoom direction, similarly as described regarding block 606 of FIG. 6. At block 1008, the apparatus determines that the zoom input is indicative of zooming beyond a zoom out threshold associated with the first camera information, similarly as described regarding block 608 of FIG. 6. At block 1010, the apparatus receives second camera information from a second camera module, similarly as described regarding block 610 of FIG. 6. At block 1012, the apparatus causes display of at least part of the second camera information, similarly as described regarding block 612 of FIG. 6. At block 1014, the apparatus receives information indicative of a different zoom input that corresponds with a different zoom direction, similarly as described regarding block 914 of FIG. 9.

At block 1016, the apparatus determines that the different zoom input is indicative of zooming within a different zoom out threshold. The determination, the zooming, and the different zoom out threshold may be similar as described regarding FIGS. 3A-3D.

At block 1018, the apparatus causes zooming out of the second camera information. In this manner, the zooming out may be based, at least in part, on the different zoom input. The zooming out may be similar as described regarding FIGS. 3A-3D.

At block 1020, the apparatus determines that the different zoom input is indicative of zooming beyond the different zoom out threshold that is associated with the second camera information, similarly as described regarding block 916 of FIG. 9. At block 1022, the apparatus the apparatus receives first camera information from the first camera module, similarly as described regarding block 918 of FIG. 9. At block 1024, the apparatus causes display of at least part of the first camera information, similarly as described regarding block 920 of FIG. 9.

At block 1026, the apparatus determines that the different zoom input comprises movement in the different zoom direction. The determination may be similar as described regarding FIGS. 3A-3D.

At block 1028, the apparatus causes zooming in of the first camera information based. In this manner, the zooming in may be based, at least in part, on the movement in the different zoom direction. The zooming in may be similar as described regarding FIGS. 3A-3D.

Figure 11:
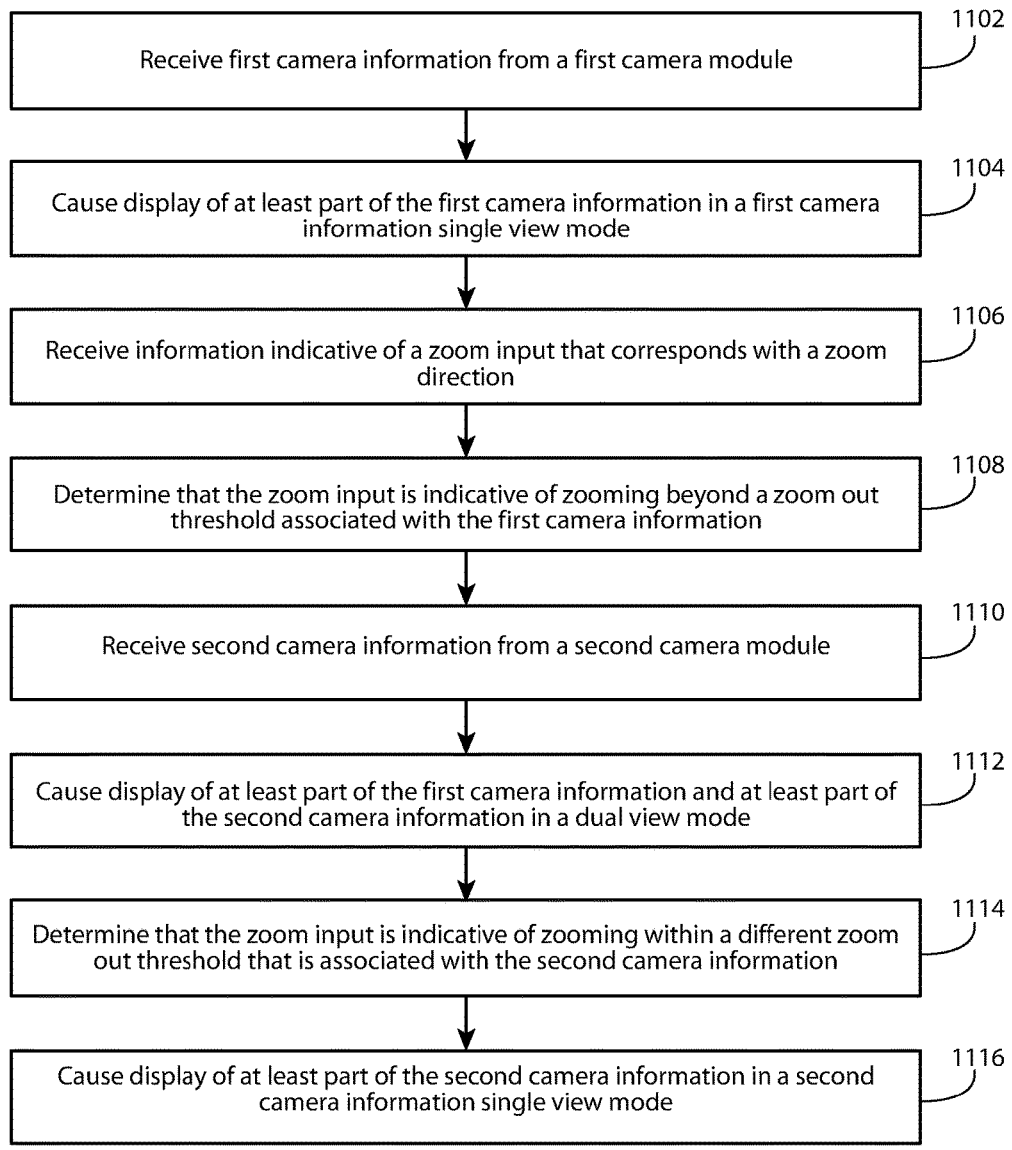
FIG. 11 is a flow diagram illustrating activities associated with display of camera information according to at least one example embodiment.

FIG. 11 is a flow diagram illustrating activities associated with display of camera information according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously described, it may be desirable to display camera information in a dual view mode. In this manner, the user may view camera information from multiple camera modules simultaneously.

At block 1102, the apparatus receives first camera information from a first camera module, similarly as described regarding block 602 of FIG. 6.

At block 1104, the apparatus causes display of at least part of the first camera information in a first camera information single view mode. The display and the first camera information single view mode may be similar as described regarding FIGS. 4A-4G and FIGS. 5A-5G.

At block 1106, the apparatus receives information indicative of a zoom input that corresponds with a zoom direction, similarly as described regarding block 606 of FIG. 6. At block 1108, the apparatus determines that the zoom input is indicative of zooming beyond a zoom out threshold associated with the first camera information, similarly as described regarding block 608 of FIG. 6. At block 1110, the apparatus receives second camera information from a second camera module, similarly as described regarding block 610 of FIG. 6.

At block 1112, the apparatus causes display of at least part of the first camera information and at least part of the second camera information in a dual view mode. In this manner, the display of at least part of the first camera information and at least part of the second camera information in a dual view mode may be based, at least in part, on the determination that the zoom input is indicative of zooming beyond the zoom out threshold. The display and dual view mode may be similar as described regarding FIGS. 4A-4G and FIGS. 5A-5G.

At block 1114, the apparatus determines that the zoom input is indicative of zooming within a different zoom out threshold that is associated with the second camera information. In this manner, the receipt of the second camera information from the second camera module may be based, at least in part, on the determination that the zoom input is indicative of zooming within the different zoom out threshold. The determination and the different zoom out threshold may be similar as described regarding FIGS. 4A-4G and FIGS. 5A-5G.

At block 1116, the apparatus causes display of the second camera information in a second camera information single view mode. The display and the second camera information single view mode may be similar as described regarding FIGS. 4A-4G and FIGS. 5A-5G.

Figure 12:
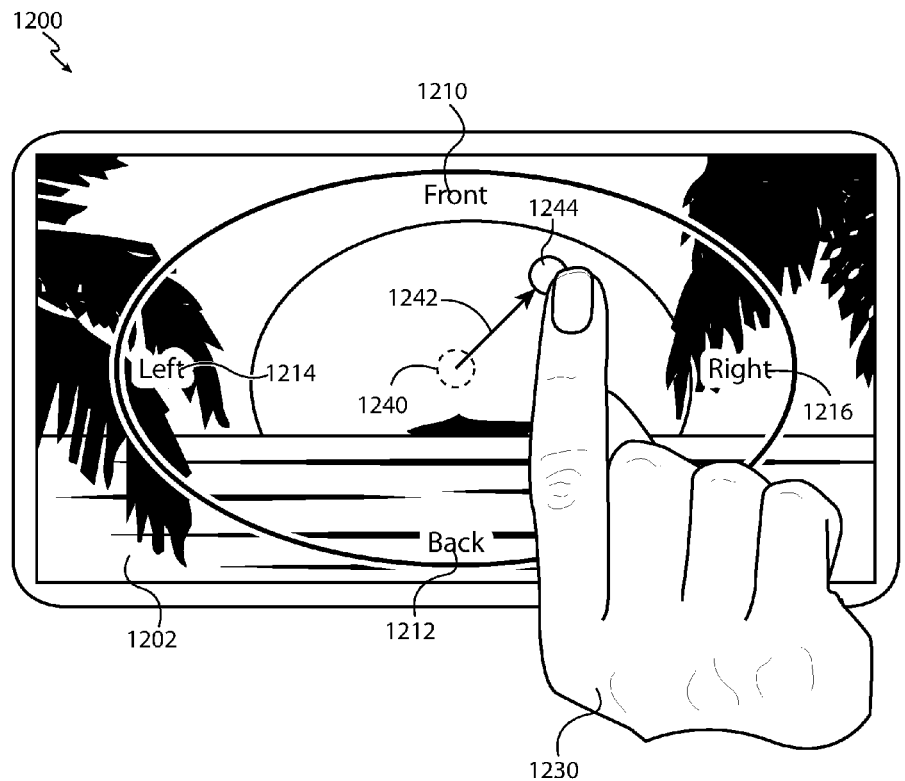
FIG. 12 is a diagram illustrating zooming of camera information according to at least one example embodiment.

FIG. 12 is a diagram illustrating zooming of camera information according to at least one example embodiment. The example of FIG. 12 is merely an example and does not limit the scope of the claims. For example, the apparatus may vary, the number of camera modules may vary, the camera directions may vary, and/or the like.

Even though the previous examples refer to control of camera information based, at least in part, on zoom input absent a separate camera module selection input, in some circumstances, it may be desirable for the apparatus to receive camera module information based, at least in part, on a camera module selection input. In at least one example embodiment, a camera module selection input refers to an input that identifies a particular camera module or group of camera modules from which to receive camera information. For example, the camera module selection input may correspond with one or more interface elements that represents one or more camera modules. In this manner, the apparatus may receive camera information from camera modules based, at least in part, on the correlation between the input and the interface elements. In such an example, the apparatus may control zooming of camera information separately from the camera module selection input. For example, the apparatus may receive a zoom input that is separate from a camera module selection input.

FIG. 12 illustrates apparatus 1200. In the example of FIG. 12, apparatus 1200 comprises a front camera module configured to face in a front camera direction, a back camera module configured to face in a back camera direction, a left camera module configured to face in a left camera direction, a right camera module configured to face in a right camera direction, and display 1202. In this manner, display 1202 may be configured to display camera information received from the camera modules. It can be seen that apparatus 1200 is displaying front camera module indicator 1210, back camera module indicator 1212, left camera module indicator 1214, and right camera module indicator 1216. In this manner, the apparatus may determine the manner in which camera module information is received based, at least in part, on input in relation to the various camera module indicators. In the example of FIG. 12, apparatus 1200 has received information indicative of an input from user 1230. It can be seen that the input is a touch input that has an initial position at position 1240 and a final position at position 1244, such that input movement portion 1242 indicates movement of the input from position 1240 to position 1244. It can be seen that position 1244 is proximate to front camera module indicator 1210 and right camera module indicator 1216. In such an example, apparatus may receive camera information from the front camera module and the right camera module based, at least in part, on the input.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 802 of FIG. 8 may be performed after block 806 of FIG. 8. Furthermore, if desired, one or more of the above-described functions may be optional or may be combined. For example, block 802 of FIG. 8 may be optional and/or combined with block 806 of FIG. 8.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

The invention claimed is:

1. A method comprising:
receiving first camera information from a first camera module that is configured to face a first camera direction;
causing display of at least part of the first camera information;
receiving information indicative of a zoom input that corresponds with a zoom direction that signifies zooming out of the first camera information;
determining that the zoom input is indicative of zooming beyond a zoom out threshold associated with the first camera information;
receiving second camera information from a second camera module that is configured to face a second camera direction based, at least in part, on the determination that the zoom input is indicative of zooming beyond the zoom out threshold and indicative of camera module selection;
causing display of at least part of the second camera information; and
wherein the first camera direction is different from the second camera direction.

2. The method of claim 1, wherein the first camera direction is substantially opposite from the second camera direction.

3. The method of claim 1, further comprising prior to determining that the zoom input is indicative of zooming beyond the zoom out threshold:
determining that the zoom input is indicative of zooming within the zoom out threshold; and
causing zooming out of the first camera information based, at least in part, on the zoom input.

4. The method of claim 1, further comprising subsequent to the determination that the zoom input is indicative of zooming beyond the zoom out threshold:
determining that the zoom input comprises movement in the zoom direction; and
causing zooming in of the second camera information based, at least in part, on the movement in the zoom direction.

5. The method of claim 1, further comprising:
receiving audio information from at least one microphone;
causing storage of the first camera information in conjunction with the audio information; and
causing storage of the second camera information in conjunction with the audio information.

6. The method of claim 1, further comprising:
receiving information indicative of a different zoom input that corresponds with a different zoom direction that is substantially opposite from the zoom direction;
determining that the different zoom input is indicative of zooming beyond a different zoom out threshold that is associated with the second camera information;
receiving the first camera information from the first camera module based, at least in part, on the determination that the different zoom input is indicative of zooming beyond the different zoom out threshold; and
causing display of at least part of the first camera information.

7. The method of claim 1, wherein causation of display of the first camera information is performed in a first camera information single view mode, and causation of display of the second camera information is performed in a second camera information single view mode.

8. An apparatus, at least comprising at least one processor, and at least one memory including computer program code, said at least one memory and said computer program code configured to, with said at least one processor, cause said apparatus at least to perform:
receive first camera information from a first camera module that is configured to face a first camera direction;
cause display of at least part of the first camera information;
receive information indicative of a zoom input that corresponds with a zoom direction that signifies zooming out of the first camera information;
determine that the zoom input is indicative of zooming beyond a zoom out threshold associated with the first camera information;
receive second camera information from a second camera module that is configured to face a second camera direction based, at least in part, on the determination that the zoom input is indicative of zooming beyond the zoom out threshold and indicative of camera module selection;
cause display of at least part of the second camera information; and
wherein the first camera direction is different from the second camera direction.

9. An apparatus of claim 8, wherein the first camera direction is substantially opposite from the second camera direction.

10. The apparatus of claim 8, wherein the at least one memory including the computer program code is further configured to, with the at least one processor, prior to determining that the zoom input is indicative of zooming beyond the zoom out threshold, cause the apparatus to:
determine that the zoom input is indicative of zooming within the zoom out threshold; and
cause zooming out of the first camera information based, at least in part, on the zoom input.

11. The apparatus of claim 8, wherein the at least one memory including the computer program code is further configured to, with the at least one processor, subsequent to the determination that the zoom input is indicative of zooming beyond the zoom out threshold, cause the apparatus to:
determine that the zoom input comprises movement in the zoom direction; and
cause zooming in of the second camera information based, at least in part, on the movement in the zoom direction.

12. The apparatus of claim 8, wherein the at least one memory including the computer program code is further configured to, with the at least one processor, cause the apparatus to:
receive audio information from at least one microphone;
cause storage of the first camera information in conjunction with the audio information; and
cause storage of the second camera information in conjunction with the audio information.

13. The apparatus of claim 12, wherein the audio information is received from a plurality of microphones such that the audio information comprises at least on leftward audio channel and at least one rightward audio channel, wherein causing storage of the second camera information in conjunction with the audio information comprises:
determine reversed polarity audio information such that a leftward channel of the reversed polarity audio information corresponds with the rightward channel of the audio information and a rightward channel of the reversed polarity audio information corresponds with the leftward channel of the audio information; and store the second camera information in conjunction with the reversed polarity audio information.

14. The apparatus of claim 8, wherein the at least one memory including the computer program code is further configured to, with the at least one processor, cause the apparatus to:

receive information indicative of a different zoom input that corresponds with a different zoom direction that is substantially opposite from the zoom direction;

determine that the different zoom input is indicative of zooming beyond a different zoom out threshold that is associated with the second camera information;

receive the first camera information from the first camera module based, at least in part, on the determination that the different zoom input is indicative of zooming beyond the different zoom out threshold; and cause display of at least part of the first camera information.

15. The apparatus of claim 14, wherein the at least one memory including the computer program code is further configured to, with the at least one processor, prior to the determination that the different zoom input is indicative of zooming beyond the different zoom out threshold, cause the apparatus to:

determine that the different zoom input is indicative of zooming within the different zoom out threshold; and cause zooming out of the second camera information based, at least in part, on the different zoom input.

16. The apparatus of claim 14, wherein the at least one memory including the computer program code is further configured to, with the at least one processor, subsequent to the determination that the different zoom input is indicative of zooming beyond the different zoom out threshold, cause the apparatus to:

determine that the different zoom input comprises movement in the different zoom direction; and cause of zooming in of the first camera information based, at least in part, on the movement in the different zoom direction.

17. The apparatus of claim 8, wherein causation of display of the first camera information is performed in a first camera information single view mode, and causation of display of the second camera information is performed in a second camera information single view mode.

18. The apparatus of claim 17, further comprising determination that the zoom input is indicative of zooming within a different zoom out threshold that is associated with the second camera information, wherein the receipt of the second camera information from the second camera module is based, at least in part, on the determination that the zoom input is indicative of zooming within the different zoom out threshold.

19. The apparatus of claim 18, further comprising causation of display of at least part of the first camera information and at least part of the second camera information in a dual view mode based, at least in part, on the determination that the zoom input is indicative of zooming beyond the zoom out threshold.

20. A non-transitory computer-readable medium encoded with executable instructions that, when executed by a computer, cause performance comprising:

receiving first camera information from a first camera module that is configured to face a first camera direction;

causing display of at least part of the first camera information;

receiving information indicative of a zoom input that corresponds with a zoom direction that signifies zooming out of the first camera information;

determining that the zoom input is indicative of zooming beyond a zoom out threshold associated with the first camera information;

receiving second camera information from a second camera module that is configured to face a second camera direction based, at least in part, on the determination that the zoom input is indicative of zooming beyond the zoom out threshold and indicative of camera module selection;

causing display of at least part of the second camera information; and wherein the first camera direction is different from the second camera direction.

* * * * *